(12) United States Patent
Place

(10) Patent No.: US 10,076,792 B2
(45) Date of Patent: Sep. 18, 2018

(54) PORTABLE BORING MACHINE

(71) Applicant: Actuant Corporation, Menomonee Falls, WI (US)

(72) Inventor: Brent K. Place, Hager City, WI (US)

(73) Assignee: Actuant Corporation, Menomonee Falls, WI (US)

( * ) Notice: Subject to any disclaimer, the term of this patent is extended or adjusted under 35 U.S.C. 154(b) by 0 days.

(21) Appl. No.: 15/186,145

(22) Filed: Jun. 17, 2016

(65) Prior Publication Data

US 2016/0368109 A1 Dec. 22, 2016

Related U.S. Application Data

(60) Provisional application No. 62/181,108, filed on Jun. 17, 2015, provisional application No. 62/193,369, filed on Jul. 16, 2015.

(51) Int. Cl.
| | |
|---|---|
| *B23B 29/034* | (2006.01) |
| *B23B 39/14* | (2006.01) |
| *B23B 29/02* | (2006.01) |
| *B23B 29/24* | (2006.01) |

(52) U.S. Cl.
CPC .............. *B23B 39/14* (2013.01); *B23B 29/02* (2013.01); *B23B 29/025* (2013.01); *B23B 29/027* (2013.01); *B23B 29/03407* (2013.01); *B23B 29/248* (2013.01); *B23B 2260/088* (2013.01); *B23B 2270/14* (2013.01)

(58) Field of Classification Search
CPC .......... B23B 29/03407; B23B 29/0341; B23B 29/24; B23B 2270/14
See application file for complete search history.

(56) References Cited

U.S. PATENT DOCUMENTS

| | | | | |
|---|---|---|---|---|
| 1,814,079 | A * | 7/1931 | Cole ................ | B23B 29/03407 29/26 R |
| 2,800,041 | A * | 7/1957 | Sten ........................ | B23B 27/18 403/104 |
| 3,327,572 | A * | 6/1967 | Lovendahl .......... | B23B 29/0341 407/104 |
| 3,343,431 | A * | 9/1967 | Boyer ................. | B23B 27/1662 407/101 |
| 3,856,427 | A * | 12/1974 | Lovendahl .......... | B23B 29/0341 408/182 |

(Continued)

*Primary Examiner* — Alan Snyder
(74) *Attorney, Agent, or Firm* — Michael Best & Friedrich LLP

(57) ABSTRACT

A feed assembly, a boring head and an alignment device. The feed assembly may include a feed mechanism; an adjustment mechanism to adjust a feed rate of the feed mechanism; and a gage to indicate the feed rate. The boring head may include a body supportable on and for rotation with the bar; and a tool holder to support a tool to work on a workpiece and supported for radial movement on the body to adjust a radial position of the tool. An alignment device may include a clamp lockable in an axial position on the bar; an alignment member engageable with a bore of a workpiece; and an adjustment member between the locking clamp and the alignment member, the adjustment member and the alignment member include complementary threads, the adjustment member being rotatable about the axis to move the alignment member relative to the clamp along the axis.

21 Claims, 30 Drawing Sheets

(56) References Cited

U.S. PATENT DOCUMENTS 4,231,691 A * 11/1980 Pape ................ B23B 29/03407
    407/39
4,990,037 A    2/1991  Strait
5,642,969 A    7/1997  Strait

* cited by examiner

PORTABLE BORING MACHINE

RELATED APPLICATIONS

The present application claims priority to U.S. Provisional Patent Application No. 62/181,108, filed Jun. 17, 2015, and U.S. Provisional Patent Application No. 62/193,369, filed Jul. 16, 2015, the entire contents of both of which are hereby incorporated by reference.

FIELD

The present invention relates to a portable machine tool and, more particularly, to a portable line boring machine assembly.

SUMMARY

In some independent aspects, a boring bar assembly may include a rotational drive unit and a mount with alignment pins to accept torque of the drive unit. The mount may provide a number of mounting locations for a feed drive or handle to be supported so that the drive unit may be used of transported in a number of different orientations. The drive unit may include a threaded clamp to adjust the bearings and to accommodate wear. The drive unit may include a double enveloping worm/worm gear arrangement.

In other independent aspects, a boring bar assembly may include a spherical bearing mount including a removable bearing cartridge allowing a bore welder or boring bar to mount in same location. The mount may provide adjustment of the boring bar by ±5 degrees with a quick-lock clamp. Radial movement of the boring bar may be provided by the mount with centering screws. The mount may cooperate with the rotational drive unit to fix the drive unit against torque.

In other independent aspects, a boring bar assembly may include one or more set up cones supporting the boring bar and having a threaded wheel to provide limited fine adjustment of the position of the bearing mount and boring bar relative to the workpiece bore.

In other independent aspects, an alignment device for a boring bar assembly may be provided. The assembly may include a rotatably drivable boring bar extending along an axis. The device may generally include a clamp connectable to and lockable in an axial position on the bar; an alignment member engageable with a bore of a workpiece; and an adjustment member between the locking clamp and the alignment member, the adjustment member and the alignment member include complementary threads, the adjustment member being rotatable about the axis to move the alignment member relative to the clamp along the axis.

In other independent aspects, a boring bar assembly may include boring heads with a radial adjustment screw to provide fine radial adjustment of the boring tool. The boring heads may include nesting sections to provide a greater range of radial adjustment. The tool holders may be axially offset to remove more material with each pass.

In other independent aspects, a boring head may generally include a body supportable on and for rotation with the bar; and a tool holder operable to support a tool to work on a workpiece, the holder being supported for radial movement on the body to adjust a radial position of the tool relative to the axis.

In other independent aspects, a boring bar assembly may include a feed assembly with a feed rate gage easily visible by a user to indicate the set feed rate. The feed assembly may include a feed clutch to easily engage and disengage the feed of the boring bar. A feed stop may be provided to stop the feed of the boring bar when a limit is reached.

In other independent aspects, a feed assembly may generally include a feed mechanism operable to move the bar along the axis as the bar rotates, the feed mechanism operating at a feed rate; an adjustment mechanism operable to adjust the feed rate of the feed mechanism; and a gage operable to indicate the feed rate of the feed mechanism.

In other independent aspects, a boring bar assembly may include an intermediate bearing support to support the boring bar between the ends. The intermediate bearing support may include an adjustable ramp mechanism for adjusting the locator(s) of the intermediate bearing support. An adjustment screw may adjust the ramp that radially adjusts the associated locator.

In other independent aspects, a boring bar assembly may include a facing head and a facing tripper assembly. A feed ramp may be provided with a screw to adjust the angle of ramp. The angle of the ramp determines how far a roller is pushed, which determines the feed rate of the facing head, with a steep ramp angle equaling a faster feed rate.

Other independent features and independent aspects of the invention will become apparent by consideration of the following detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Figure 1:
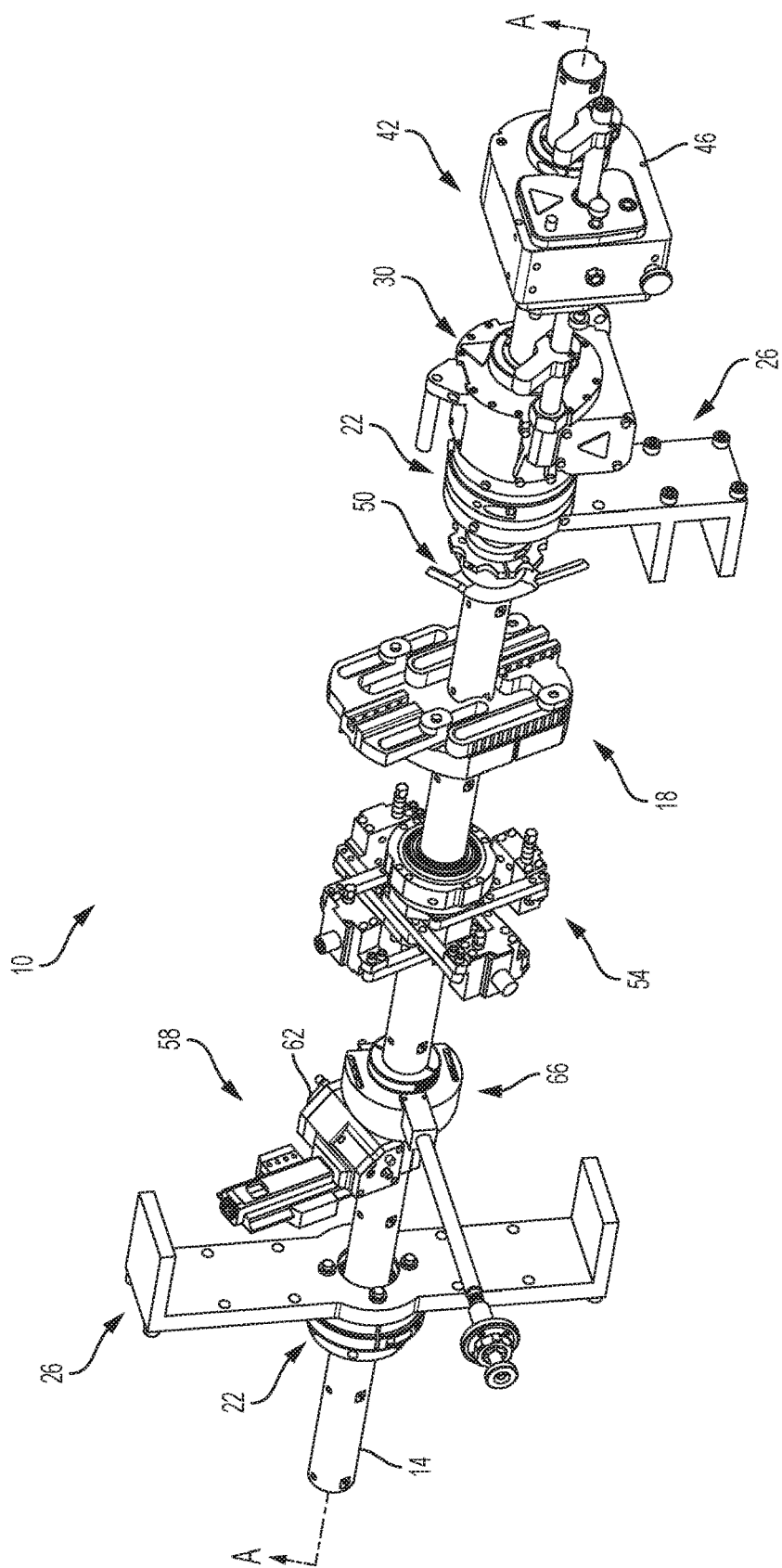
FIG. 1 is a perspective view of a portable boring assembly.

FIG. 1 illustrates a portable boring assembly 10 operable to remove material from a bore (not shown) of a workpiece (not shown). The boring assembly 10 is operable to remove material from within the bore and from the face(s) of the workpiece proximate the bore and, in some cases, to add material to the workpiece with a bore welder (not shown). The boring assembly 10 is constructed to be easily portable and assembled on a work site.

General

The boring assembly 10 includes a boring bar 14 axially fitted through the bore(s) defined by a workpiece and a boring head assembly 18 fixedly coupled to the bar 14 for removing material within the bore(s) of the workpiece as the bar 14 rotates. The bar 14 has a central longitudinal axis A and is supported by spherical bearing mounts 22. The mounts 22 are mounted to end support brackets 26 coupled to the workpiece adjacent the bores and are adjustable to align the bar 14 with a desired central axis of the bore of the workpiece. The mounts 22 are also configured to optionally mount and secure the bore welder.

Figure 13:
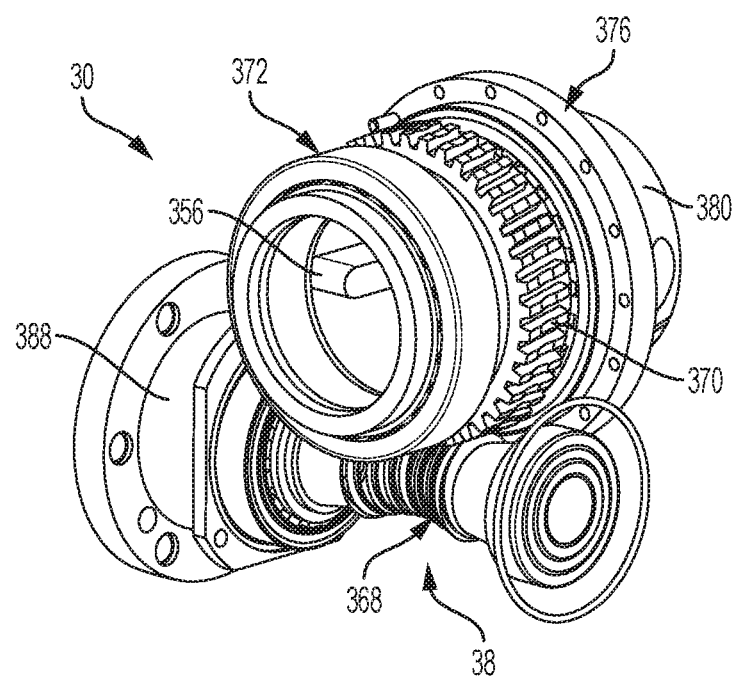
FIG. 13 is a perspective view of the rotational drive unit of FIG. 12 illustrating a gear set.
Figure 14:
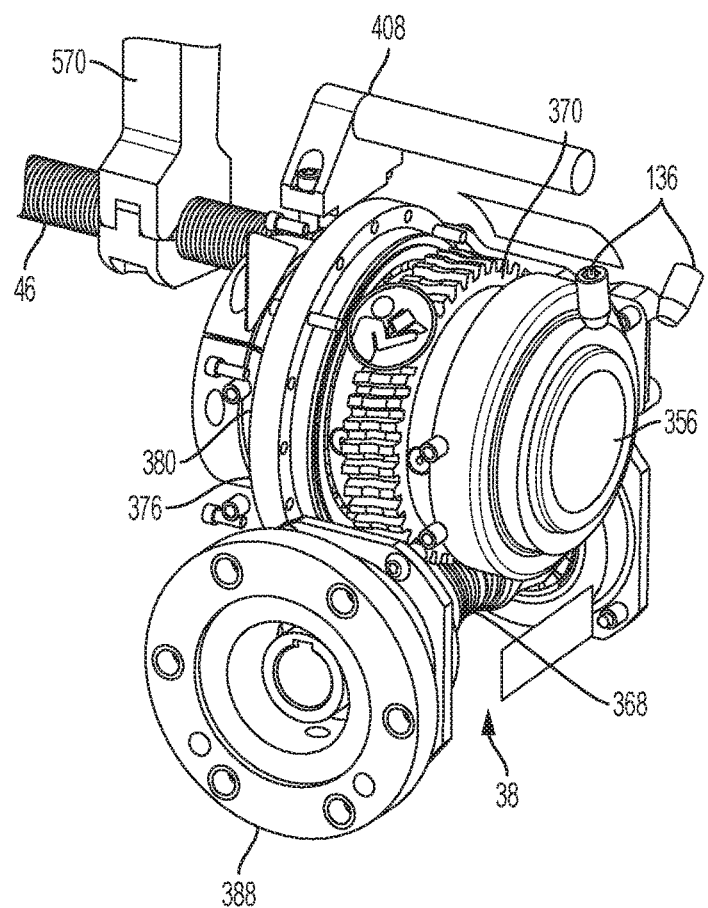
FIG. 14 is a perspective view of the rotational drive unit of FIG. 12.

A rotational drive unit 30 includes a motor (not shown), and a gear set 38 (see FIG. 13) couples the bar 14 to the motor to rotate the bar 14. The drive unit 30 is secured to the mounts 22 and the brackets 26 to inhibit axial and/or rotational motion of the drive unit 30. An axial feed assembly 42 converts rotation of the bar 14 into axial feed movement to move the bar 14 axially along a lead screw 46 and through the bore of the workpiece.

At least one alignment cone or set up cone 50 assists in aligning the longitudinal axis A of the bar 14 with the desired axis of the bore of the workpiece. An intermediate bearing support 54 is coupled to the bar 14 to provide additional support to the boring assembly within the bore when the brackets 26 are spaced apart.

A facing assembly 58 performs a facing operation on a face of the workpiece around the bore. The facing assembly 58 includes a facing head 62 to transfer rotation of the bar 14 to radial feed and a facing tripper assembly 66 to control a radial feed rate of the facing assembly 58.

In operation, the bar 14 and the boring head 18 are positioned within the bore of the workpiece, with opposite ends of the bar 14 supported by the mounts 22. The cone 50 may then be used to align the longitudinal axis A of the bar 14 with the desired center of the bore. Once aligned, the drive unit 30 rotates the bar 14 about the axis A of the bar 14 when the motor is activated. The feed assembly 42 converts the rotation of the bar 14 into axial travel, for each revolution of the bar 14, moving the bar 14 and the head assembly 18 a predetermined linear distance along the axis A through the bore of the workpiece. The head assembly 18 operates to remove material within the bore of the workpiece, reshaping the bore to a desired uniform diameter. While performing the boring operation the facing assembly 58 is operable to remove material from the face of the workpiece around the bore.

If the bore is worn or the bore is not uniform, a bore welder may be mounted to the mounts 22 to perform a welding operation to add material to the bore. The bore welder may then be removed from the mounts 22, and the portable boring assembly 10 may be supported by the mounts 22 and operable to remove material from the bore as described above to reshape the bore.

Spherical Bearing Mount

Figure 2:
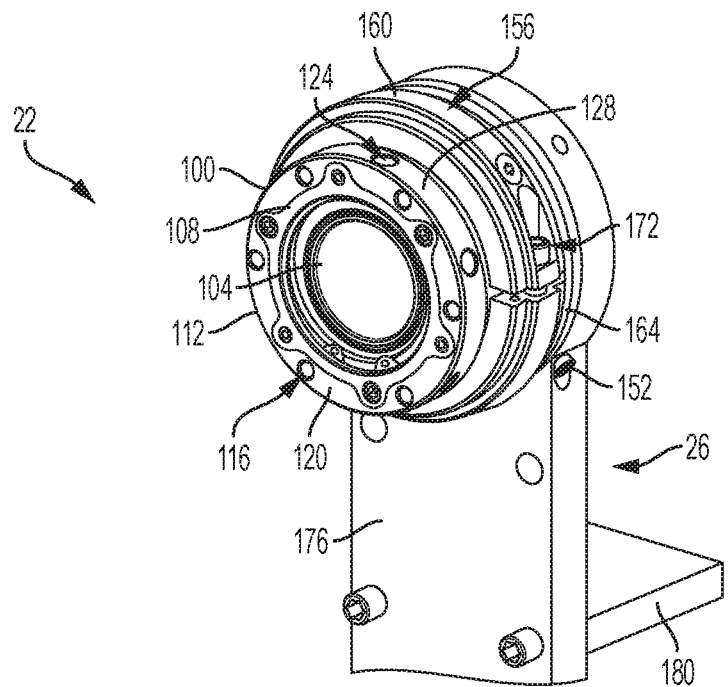
FIG. 2 is a perspective view of a spherical bearing mount.
Figure 3:
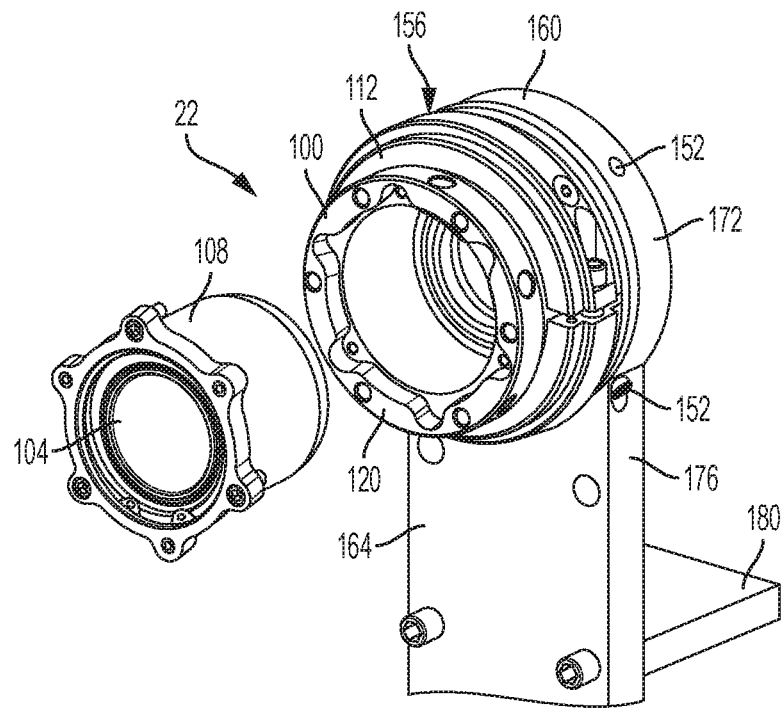
FIG. 3 is a perspective view of the spherical bearing mount of FIG. 2 illustrating a removable bearing cartridge.
Figure 4:
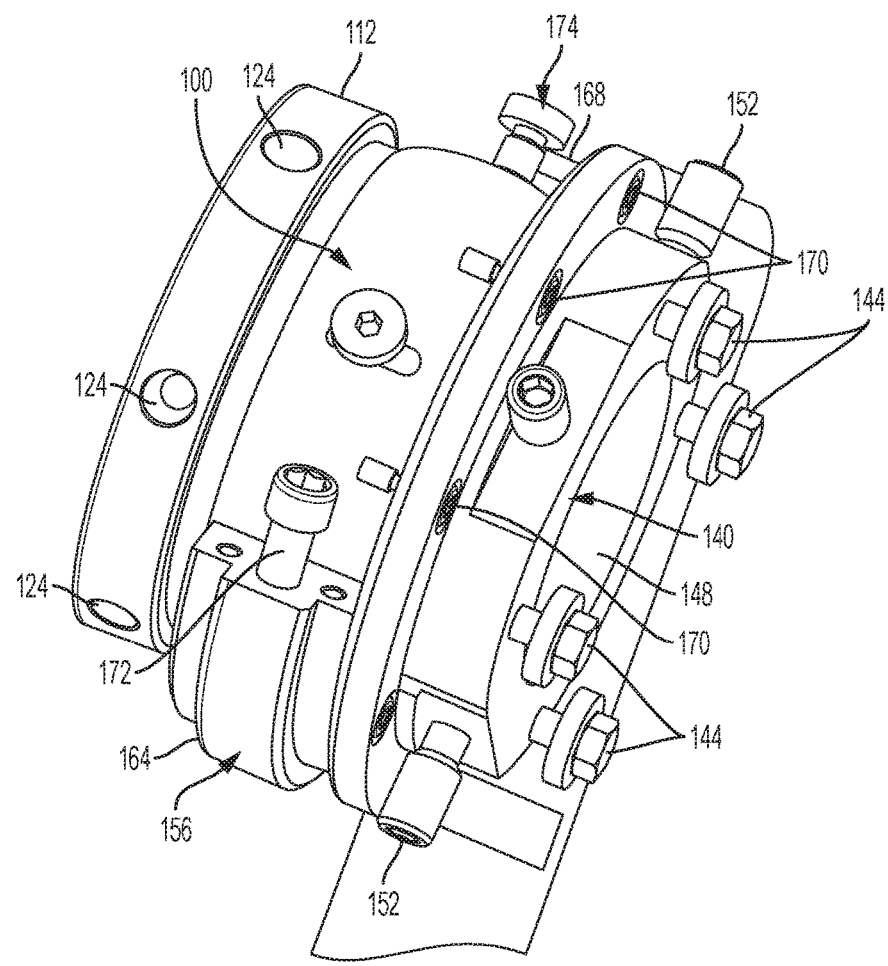
FIG. 4 is a perspective view of the spherical bearing mount of FIG. 2.
Figure 5:
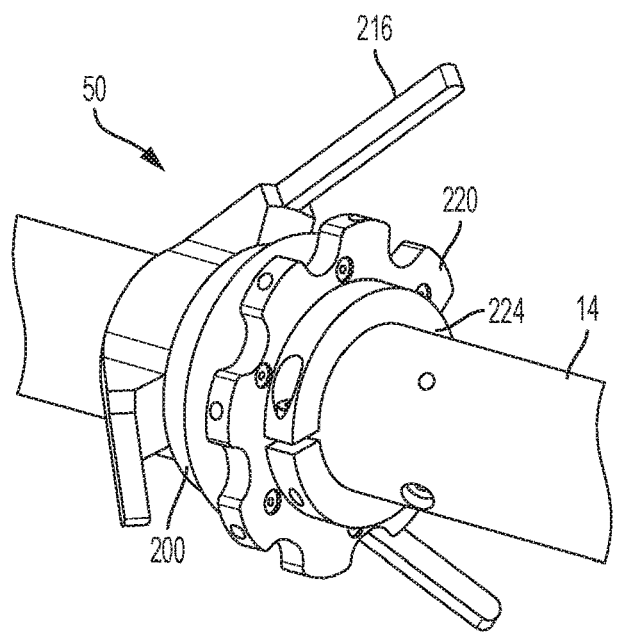
FIG. 5 is a perspective view of a set up cone.
Figure 6:
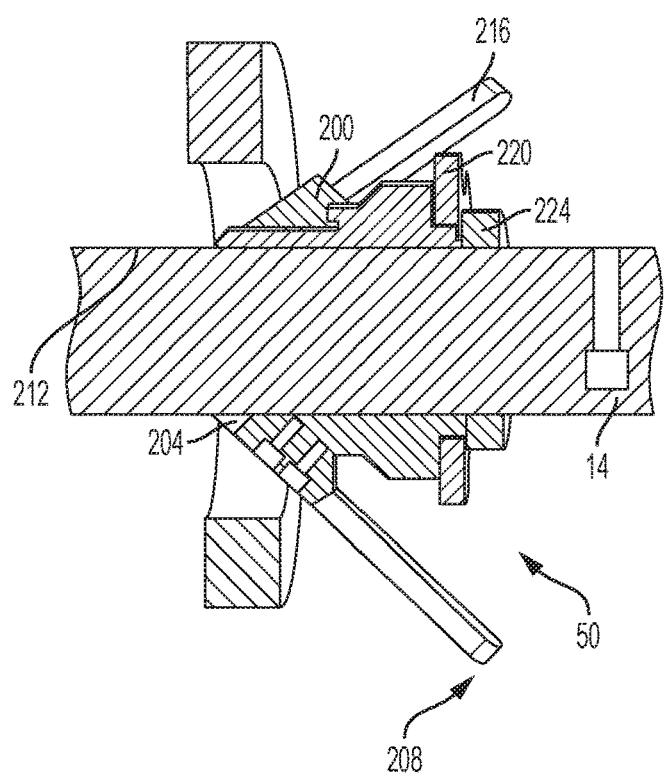
FIG. 6 is a cross-sectional view of the set up cone of FIG. 5.

As illustrated in FIGS. 2-4, each of the spherical bearing mounts 22 includes a swivel housing 100 and a self-centering, heavy-duty bearing 104 supported within the swivel housing 100. The bearing 104 is supported in a bearing cartridge 108 that is removable from the swivel housing 100. The mounts 22 are configured to support an optional bore welder via a welding adaptor installation when the cartridge 108 is removed to protect the bearing 104 from heat stress of welding. With the removable cartridge 108, the user does not have to reset the bar 14 after the final pass.

Figure 12:
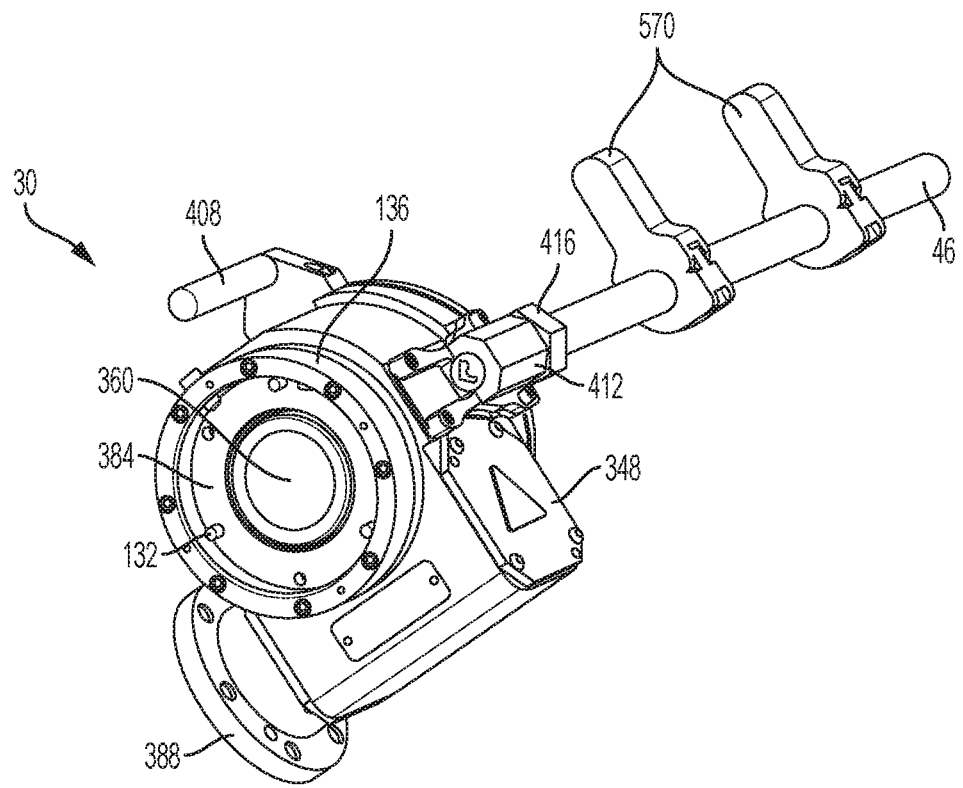
FIG. 12 is a perspective view of a rotational drive unit.

The swivel housing 100 defines a flange 112 having a number of (e.g., six) axial holes 116 on an end face 120 of the flange 112 and a number of radial holes 124 around an annular outer surface 128 of the flange 112 spaced radially around a central axis of the mount 22. The holes 116, 124 are configured to mate with corresponding alignment pins 132 and locking screws 136, respectively, of the drive unit 30 (FIG. 12). The illustrated swivel housing 100 can pivot up to about 5 degrees in all directions about a central axis of the mounts 22. In other constructions, the swivel housing 100 can pivot to a lesser degree (e.g., 2-3 degrees) or to a greater degree (e.g., 7-8 degrees, 10 degrees, etc.).

Each mount 22 further includes a radial adjustment plate 140 bolted to each bracket 26 with a number of (e.g., four) hex bolts 144 radially spaced around a central axis of an opening 148 in the end support bracket 26. The plate 140 is configured with a number of (e.g., four) radial alignment screws 152 (e.g., dog nose set screws) positioned radially around the end support bracket 22 for radial adjustment (e.g., up to ¼ inch precision alignment). In the illustrated embodiment, the plate 140 has ⅛ inch of radial travel about the central axis of the opening 148 of the bracket 26.

Each mount 22 further includes a swivel clamp 156 having a top half 160 and a bottom half 162 clamped together by a pair of bolts 164 to secure the swivel housing 100 in place. The bottom half 162 is bolted directly to the plate 140 to maintain the central axis of the swivel housing 100 in line with a central axis of the swivel clamp 156 and to also keep the swivel clamp 156 rigidly supported. The top half 160 is secured to the plate 140 with shoulder bolts 168 extending through holes 170 in the adjustment plate 140. The holes 170 in the plate 140 are oversized so that the top half 160 of the swivel clamp 156 can move radially, but not axially, allowing for the top half 160 of the swivel clamp 156 to be tightened and loosened against the swivel housing 100 by turning the swivel clamp bolt 172. In the illustrated embodiment, the swivel clamp 156 has a number of (e.g., two) torque reaction screws 174 (e.g., anti-torque screws) to prevent rotation of the swivel housing 100 within the swivel clamps 156.

The brackets 26 may include one, two, or any number of support arms 176 coupled to the workpiece and may be of various thicknesses (e.g., 1.0 inch). Each bracket 26 includes a standoff spacer 180 to space the bracket 26 and the mounts 22 from the workpiece and the bore(s). The spacer 180 bolts to the arms 176 with lock down screws, and the arms 176 are secured to workpiece by welding, clamping, bolting, etc.

In operation of the mounts 22, the bar 14 is inserted axially through each bearing 104. Once the swivel housings 100 are secured from swiveling by the associated swivel clamp 156, the radial alignment screws 152 are individually turned to move the bar 14 radially within the bore of the workpiece until the axis of the bar 14 is coaxial with the desired axis of the bore of the workpiece.

If the welder is to be used, the cartridge 108 and the bearing 104 are removed, and the welder is supported in the swivel housing 100. After welding is completed, the welder is removed, and the cartridge 108 with the bearing 104 is re-installed to support the bar 14.

The mounts 22 provide a removable cartridge 108 so that the bar 14 and the welder can be used in the same location. The mounts 22 provide adjustable mounting of the bar 14 to ±5 degrees with the swiveling housing 100 and a quick lock clamp with the swivel clamp 156. The mounts 22 also allow radial movement of the bar 14 with the plate 140 and screws 152. As discussed below, the mounts 22 provide anti-torque support of the drive unit 30 with the axial holes 116.

Set Up Cones

As illustrated in FIGS. 5-8, the set up cone 50 is positioned on the bar 14 and is used to center the bar 14 in a bore of the workpiece. The cone 50 includes an alignment member or cone member 200 having a bore 212 to receive the bar 14, a plurality of steel extension legs 216, an adjustment member or hand-operated threaded adjustment wheel 220, and a locking clamp 224.

The legs 216 are positioned on the cone 200 to taper outwardly in a cone shape from a first small diameter end 204 to a second large diameter end 208. Depending on the diameter of the bore of the workpiece different extensions legs 216 having different lengths may be used with the cone 50. In the illustrated embodiment, short legs 216 are used to center the bar 14 within a bore of the workpiece having a diameter between 2.50 to 9.0 inches, while long legs 216 may also be used for a bore of the workpiece having a diameter between 5.0 to 12.0 inches. Another cone and extension leg arrangement may be used for bores having diameters between 1.375 to 5.0 inches. In other embodiments, the cone member 200 and the legs 216 may be of any size and length for operation with any range of bores.

The cone(s) 50 are clamped tightly to the bar 14 by the clamp 224, and the cone member 200 is (see FIGS. 7-8) pinned to the clamp 224 to rotationally fix the cone member 200 and the clamp 224. A pin 226 is received in a slot 228 in the cone member 200 to allow relative axial movement between the cone member 200 and the clamp 224.

Figure 7:
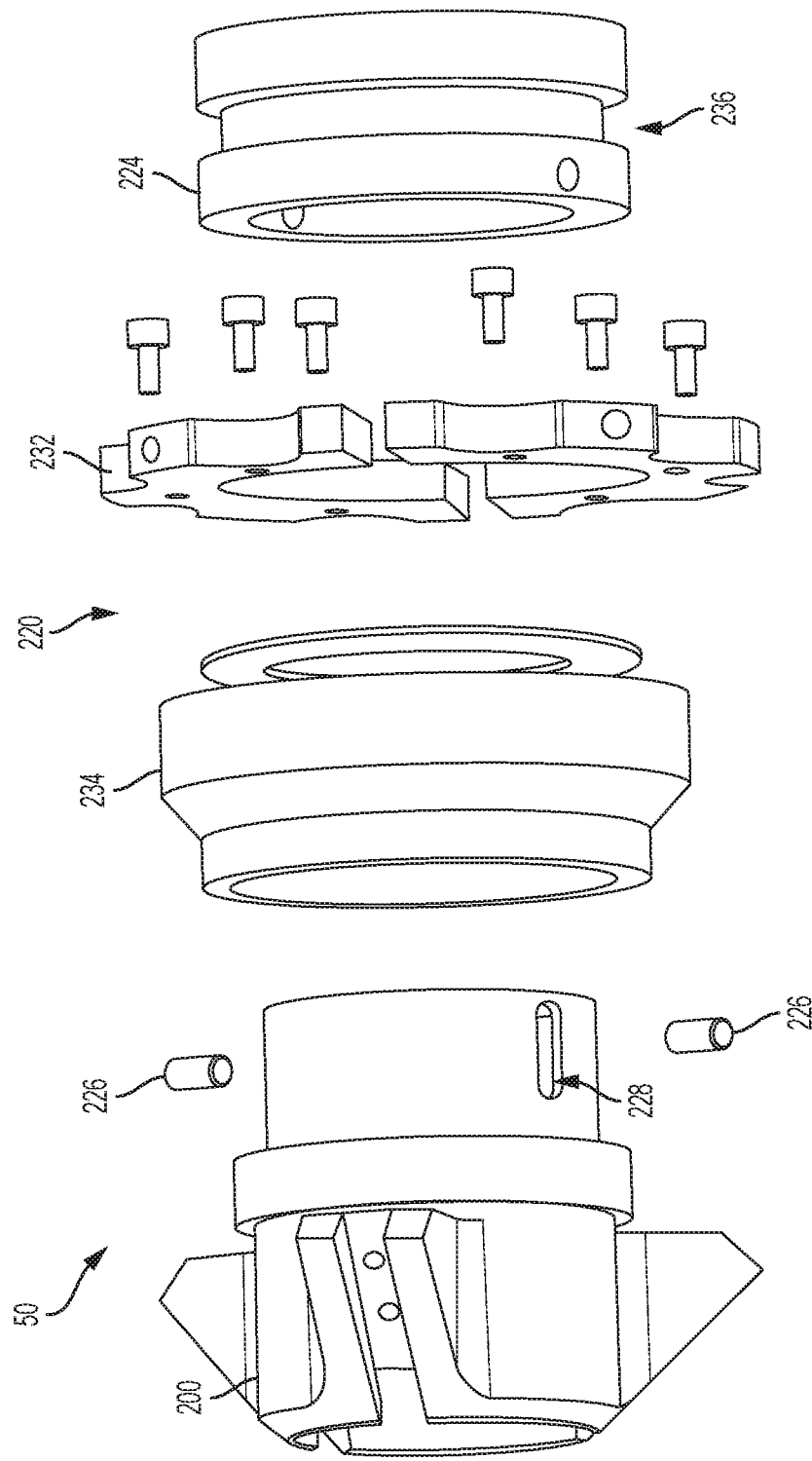
FIG. 7 is an exploded view of a set up cone.
Figure 8:
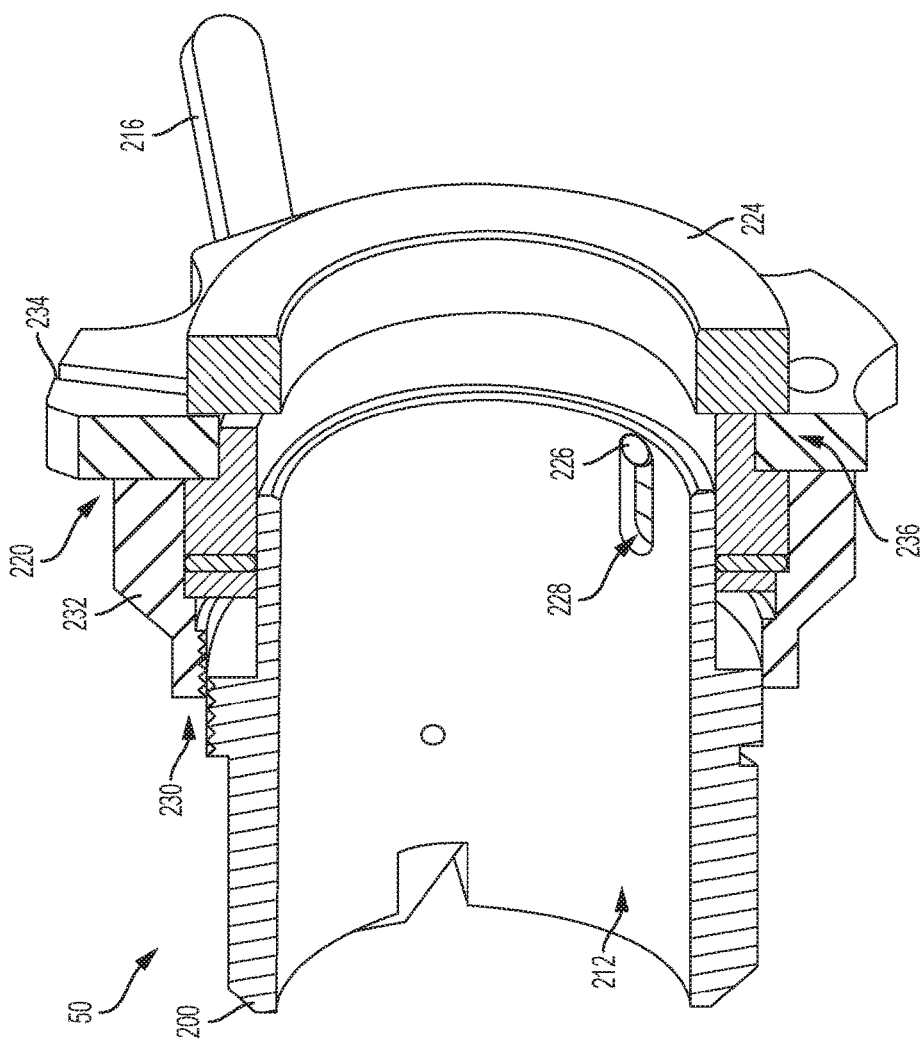
FIG. 8 is a cross-sectional view of the set up cone of FIG. 7.

The adjustment wheel 220 is manually rotated about the axis of the bar 14 and (see FIG. 8) threads 230 on the adjustment wheel 220 and the cone member 200 cooperate to advance/retract the cone member 200 axially along the bar 14 (e.g., up to ½ inch of axial travel). As shown in FIGS. 7-8, the illustrated adjustment wheel 220 includes an actuator portion 232 pinned to a threaded adjustment portion 234. The actuator portion 232 is rides in an annular groove 236 defined in the exterior of the clamp 224 to axially fix the adjustment wheel 220 relative to the clamp 224.

A cone 50 is used for each bore of the workpiece to align the associated spherical bearing mount 22. In operation of the cone(s) 50, the bar 14 is slid into the bore 212 of the cone member 200. The small diameter end 204 is positioned within the bore of the workpiece. The clamp 224 is then tightened securing the cone 50 axially to the bar 14. The adjustment wheel 220 may be turned to move the set up cone member 200 axially further into the bore of the workpiece so that the legs 216 are adjacent the workpiece.

A mechanical alignment device (not shown) applies pressure on the cone 50 to accurately align the bar 14 in the bore of the workpiece. The mechanical alignment device is operated, displacing the cone 50 toward the workpiece causing the bar 14 to shift, thereby aligning the axis A of the bar 14 with the desired center axis of the bore of the workpiece.

The cone(s) 50 with the adjustment wheel 220 provide limited fine adjust of the associated bearing mount 22 and the end of the bar 14 relative to the bore of the workpiece.

Intermediate Bearing Support

Figure 9:
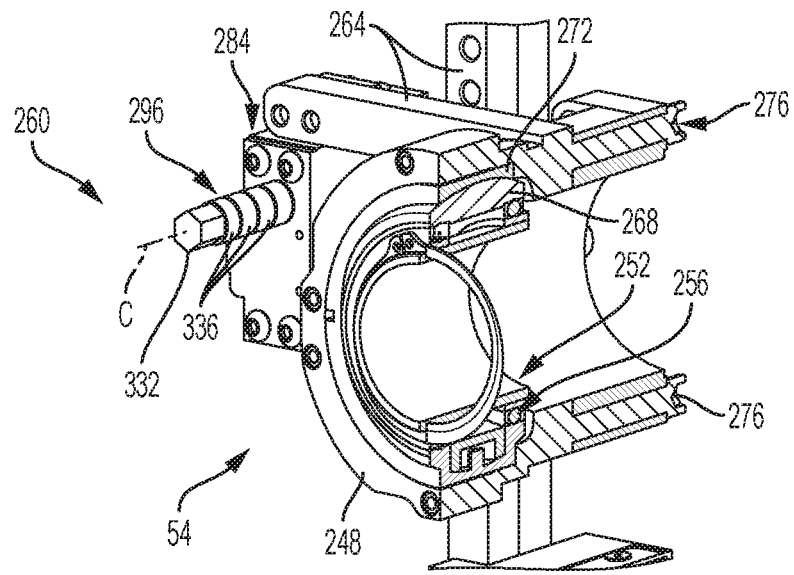
FIG. 9 is a perspective view of an intermediate bearing support.
Figure 10:
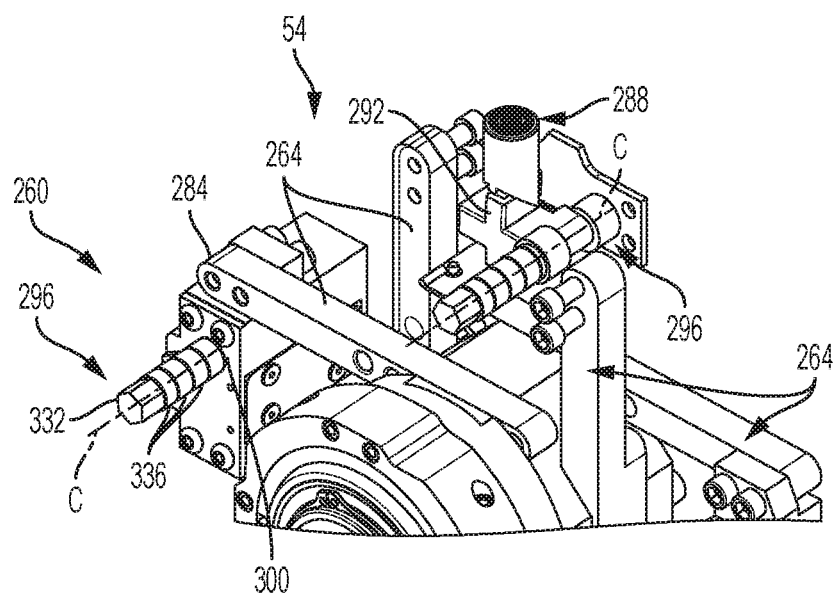
FIG. 10 is a perspective view of a locator housing of the intermediate bearing support of FIG. 7.
Figure 11:
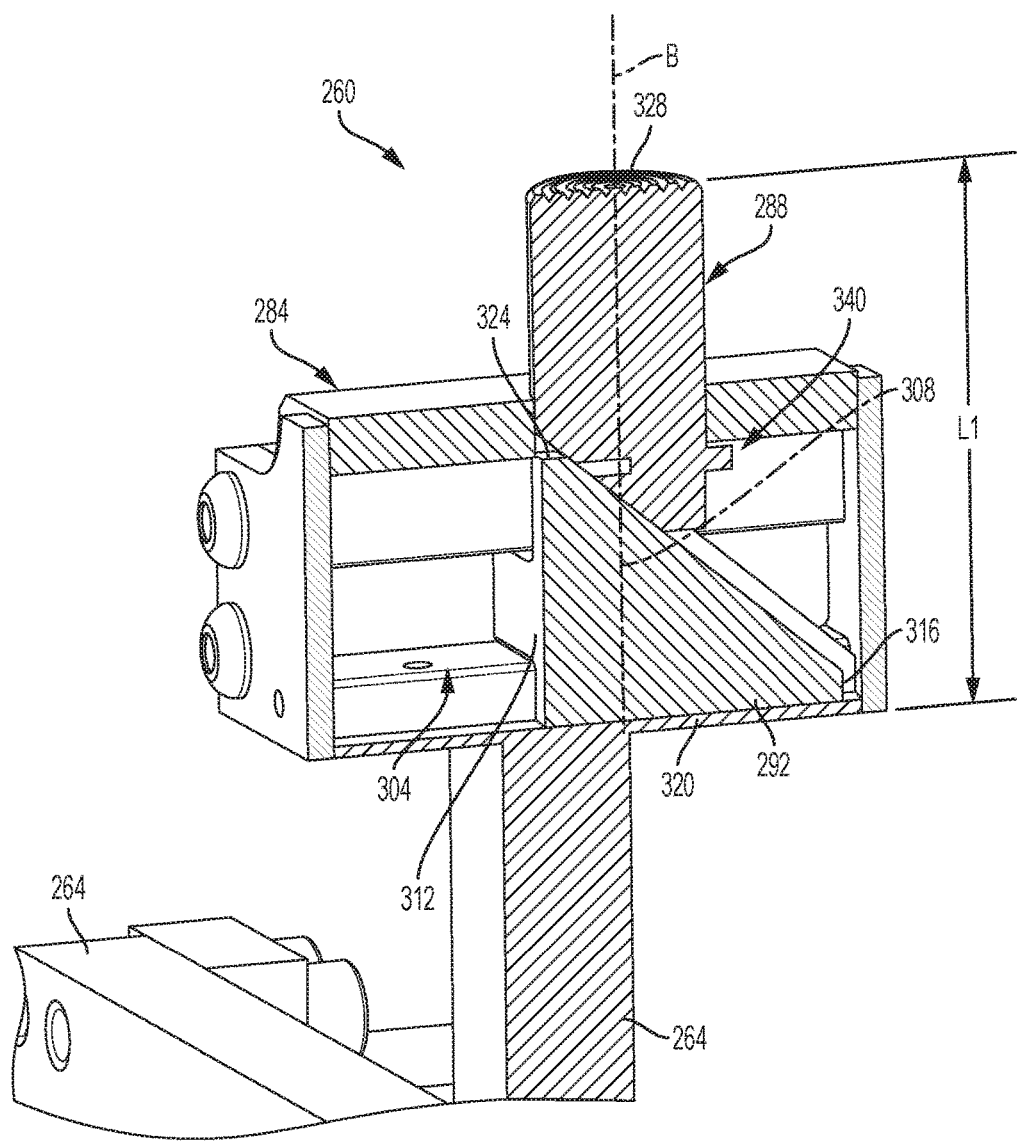
FIG. 11 is a cross-sectional view of the locator housing of FIG. 10.

FIGS. 9-11 illustrate the intermediate bearing support 54 which slidingly supports the bar 14 between the brackets 26. When the brackets 26 are spaced apart (e.g., greater than approximately 48 inches), additional support for the bar 14 is required.

The bearing support 54 includes a support housing or central hub 248 axially mounted to the bar 14 by a bushing 252 that rotates on a pair of ball bearings 256, a plurality of locator assemblies 260, and a plurality of mounting legs 264 to secure the locator assemblies 260 to the hub 248. The bearings 256 are mounted inside a swivel 268 that, like the swivel housing 100, can pivot up to 5 degrees in any direction about the axis of the bushing 252 which is coaxial with the axis A of the bar 14.

An adjustable swivel clamp 272 allows the user to increase a resistance to rotating relative to the bar 14. Four leg bolts 276 secure the legs 264 to the hub 248. In the illustrated embodiment, there are four locator assemblies 260, and each locator assembly 260 is secured to the hub 248 by two legs 264, each mounted to the hub 248 by leg bolts 276. Tightening the bolts 276 secures the legs 264 to each other and to the hub 248 to maximize rigidity.

With reference to FIGS. 9-10, the legs 264 are staggered along an axial length of the hub 248 to slide past one another in a nested configuration. The nested configuration allows for a minimum radial mounting clearance with a maximum radial reach while also minimizing an axial length of the bearing support 54. The legs 264 may be of any length and may themselves be adjustable in length to provide further adjustment, to further increase or decrease the radial mounting range. In alternate embodiments, the legs 264 may be replaceable with legs 264 of various lengths.

With reference to FIGS. 10-11, each locator assembly 260 includes a locator housing 284, a locator 288 having a longitudinal axis B, a wedge 292 and an adjustment screw 296. The adjustment screw 296 is threaded into a locator bore 300 defined in the housing 284. The wedge 292 that has a protrusion (forming a generally "t" shaped profile) configured to slide in a groove 304 within the housing 284. The wedge 292 is configured to mate with a recessed portion 306 of the adjustment screw 296 so that turning the screw 296 causes the wedge 292 to move linearly in the locator housing 284 along the groove 304.

The wedge 292 has an angled top surface 308 extending between a tall edge 312 and a short edge 316 and a flat bottom surface 320 opposite the angled top surface 308. The top surface 308 of the wedge 292 mates with a complementary angled bottom surface 324 of the locator 288. Axial movement of the wedge 292 within the locator housing 284 causes the locator 288 to extend or retract from the locator housing 284 due to the movement of the angled top surface 308 of the wedge 292 to either increase or decrease the radial mounting length, by rotating the adjustment screw 296. The top surface 308 of the wedge 292 and the bottom surface 324 of the locator 288 are stepped to prevent the locator 288 from rotating within the locator bore 300 as the wedge 292 is moved. Additionally, a pin 340 is pressed into the locator 288 to prevent the locator 288 from falling out of the locator housing 284.

As the adjustment screw 296 is rotated in a first direction, the wedge 292 is moved so that the tall edge 312 is closer to the axis B of the locator 288. This forces the locator 288 to extend out of the locator bore 300 as the bottom surface 324 of the locator 288 rides on the top surface 308 of the wedge 292, increasing a length L2 between a top surface 328 of the locator and the bottom surface of the wedge 292.

Conversely, as the adjustment screw 296 is rotated in a second, opposite direction, the wedge 292 is moved so that the short edge 316 is closer to the axis B of the locator 288. As the bottom surface 324 of the locator 288 rides down the top surface 308 of the wedge 292, the length L1 between the top surface 328 of the locator 288 and the angled bottom surface 324 of the wedge 292 decreases.

The radial mounting length of the bearing assembly 54 is adjusted to securely support and fit the diameter of the bore of the workpiece. In the illustrated embodiment, the adjustment screw 296 has a hex shaped end 332 engaged by a hex tool or wrench to assist in rotating the adjustment screw 296. The adjustment screw 296 has a series of reference rings 336 adjacent the end 332 to give the user a reference for adjusting each of the locators 288 equally. Additionally, the longitudinal central axis C of the adjustment screw 296 and the axis B of the locator 288 are configured to be substantially perpendicular to one another. This allows the bearing support 54 to be positioned within the bore of the workpiece while still being able to turn the adjustment screw 296 to adjust the locator 288.

In operation, the bearing support 54 is inserted axially onto the bar 14 so that bearing support 54 is supported by the bushing 252 on the bar 14. The bearing support 54 is moved axially along the bar 14 until the bearing support 54 is positioned within the bore of the workpiece. The adjustment screw 296 of each locator 288 may then be turned until each locator 288 contacts an interior wall of the bore.

Rotational Drive Unit

As illustrated in FIGS. 12-16, the rotational drive unit 30 includes a housing 348 with a generally cylindrical housing portion 352 having a central longitudinal axis coaxial with the axis A of the bar 14. The housing 348 encloses the gear set 38 configured to transmit rotation from the motor to a drive hub 356 supported by tapered facing roller bearings 372.

The drive hub 356 is fitted to the bar 14 and is coaxial with the axis of the housing portion 352. The drive hub 356 includes a key 360 that engages a keyway (not shown) in the bar 14 so that the bar 14 rotates with the drive hub 356 relative to the housing 348, while still allowing the bar 14 to move axially relative to the housing 348.

In the illustrated construction, the gear set 38 of the drive unit 30 is a double enveloping gear set 38 including a cone gear drive 368. The cone gear drive 368 is located in the housing 348 and is driven by the motor (e.g., a pneumatic, a hydraulic, or an electric motor) mounted to a motor mount 388 integral to the housing 348. The cone gear 368 meshes with a drive hub gear 370 fitted around the drive hub 356. The drive hub 356 is rotated by the drive hub gear 370, and the bar 14 is thereby rotatably driven.

In alternative embodiments the cone drive gear may be replaced with a worm gear drive and may also have a 5-to-1 gear ratio. The motor may be mounted on either side of the gear set 38 as required by the needs of the user.

Tapered facing roller bearings 372 are held in the housing 348 by a threaded clamp ring 376 and may be tightened to remove slop in the housing 348 as wear occurs. The bearings 372 are axially adjusted by turning the clamp ring 376.

The drive unit 30 further includes a clamp ring 380 around an outer diameter of the drive hub 356 operable to remove any excessive play between the bar 14 and the drive hub 356. The drive hub 356 and the clamp ring 380 are also configured so that a boring bar having a smaller diameter (e.g., 2 inches, 1.75 inches and 1.25 inches) may be used.

Figure 15:
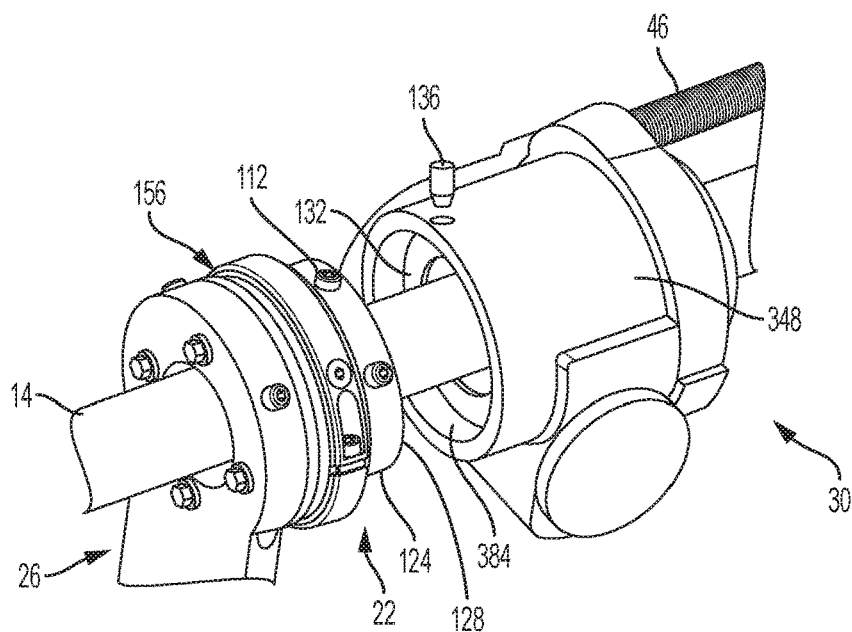
FIG. 15 is a perspective view of the rotational drive unit of FIG. 12 and spherical bearing mount of FIG. 2.
Figure 16:
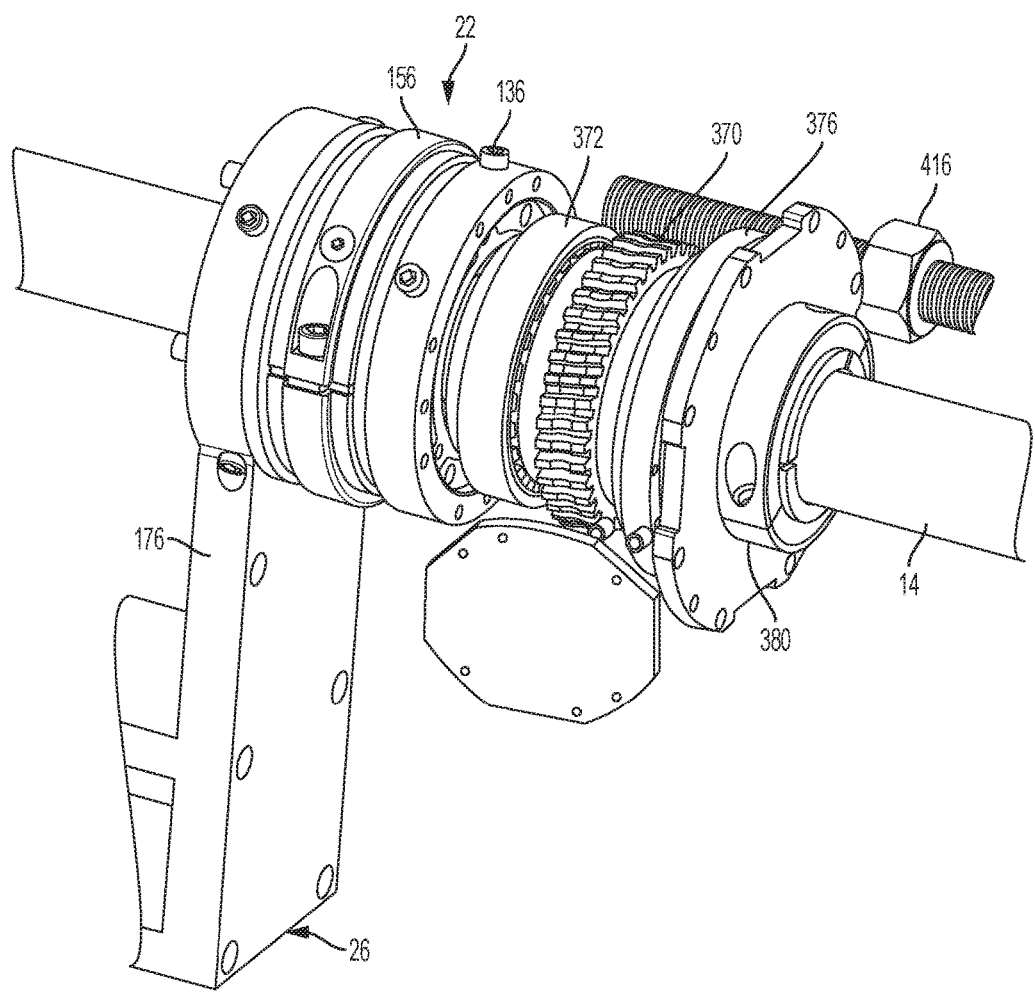
FIG. 16 is a perspective view of the rotational drive unit of FIG. 12 mounted to the spherical bearing mount of FIG. 2.

With reference to FIGS. 12 and 15-16, the housing portion 352 has a counterbore 384 configured to receive the flange 112 of the swivel housing 100 to mount the drive unit 30 to the end support bracket 26. In the illustrated embodiment, the counterbore 384 supports a number of (e.g., three) alignment pins 132 configured to be received by a corresponding number of (e.g., three) the holes 116 on the end face 120 of the flange 112. A number of (e.g., two) locking screws 136 are located radially around the counterbore 384 and transversely engage a corresponding number of (e.g., two) of the holes 124 radially spaced around the outer annular surface 128 of the flange 112 of the swivel housing 100.

The alignment pins 132 engage the holes 116 of the swivel housing 100 to inhibit the drive unit 30 from rotating about the bar 14 during operation by fixing the drive unit 30 relative to the end support bracket 26. The locking screws 136 have a tapered shank so that as the locking screws 136 are tightened to the swivel housing 100, the housing 348 of the drive unit 30 is pulled tight to the end face 120 of the flange 112 of the swivel housing 100.

The holes 116, 124 on the flange 112 of the swivel housing 100 are configured so that there are six possible orientations of the drive unit 30 relative to the mounts 22. In alternate embodiments, there may be any number of holes 116, 124 to allow for any number of orientations of the drive unit 30.

The drive unit 30 may be positioned anywhere along the bar 14. The drive unit 30 may include chip shields (not shown) to inhibit or prevent removed material (i.e., chips) from getting under the drive unit 30 when mounted vertically.

In operation, the drive unit 30 is slid onto the bar 14 so that the counterbore 384 receives the flange 112 of the swivel housing 100. The alignment pins 132 are aligned with and received in selected the holes 116 in the end face 120 of the flange 112, while the locking screws 136 are aligned with the holes 124. The pair of locking screws 136 is then threaded into the holes 124 to secure the drive unit 30 relative to the workpiece.

Activating the motor causes the motor to drive the cone gear drive 368, and the cone gear drive 368 drives the drive hub gear 370. The drive hub gear 370, in turn, rotates the drive hub 356 and the bar 14 relative to the housing 348 of the drive unit 30.

In cooperation with the mounts 22, the drive unit 30 is provided anti-torque support, resulting in up to 25% greater output torque capacity. Wear of the bearings 372 may be compensated by the clamp ring 376. A double enveloping worm and worm gear set 38 may be used.

Rotational Drive Unit Mount

Figure 17:
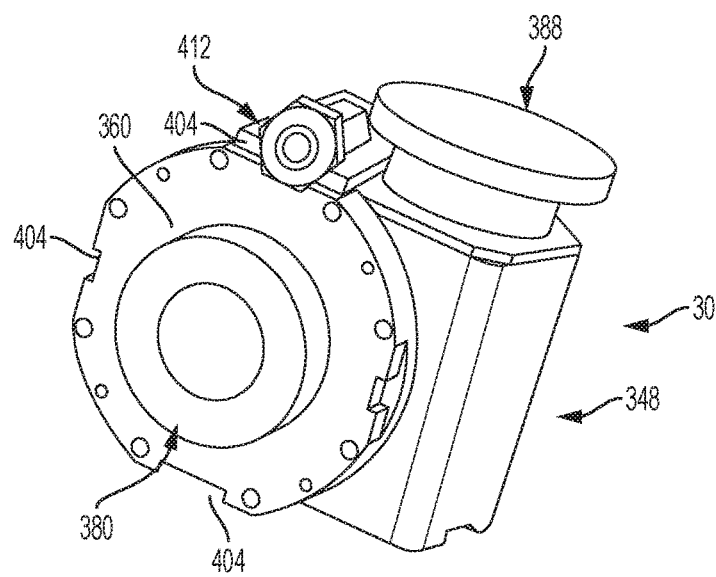
FIG. 17 is a perspective view of the rotational drive unit of FIG. 12 illustrating a lead screw mount secured to a flat mounting region.
Figures 18, 19:
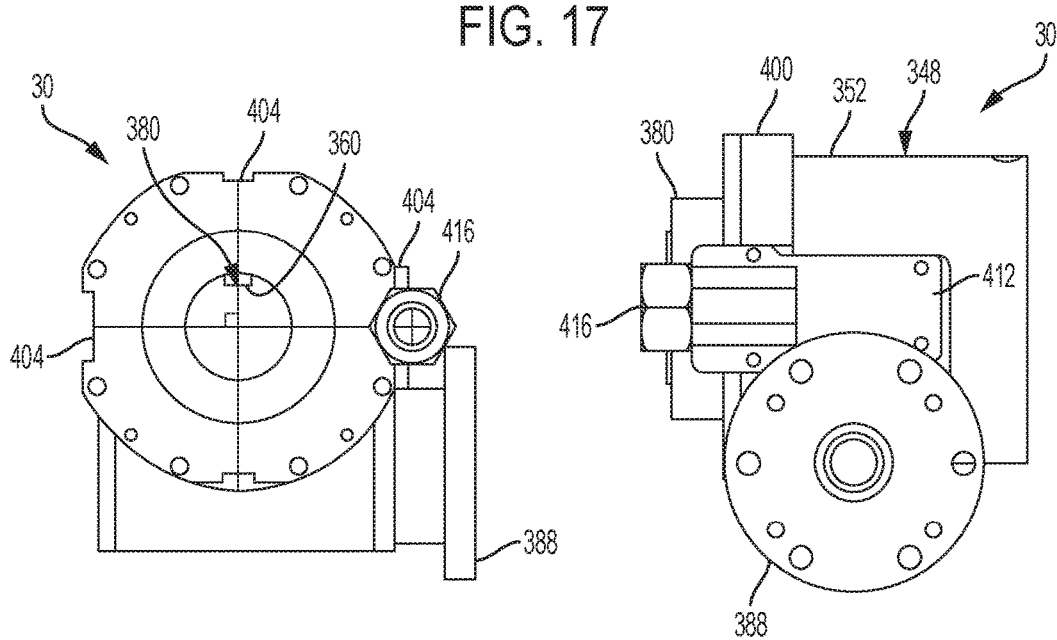
FIG. 18 is a front view of the rotational drive unit of FIG. 12 illustrating a lead screw mount secured to a flat mounting region.
FIG. 19 is a side view of the rotational drive unit of FIG. 12 illustrating a lead screw mount secured to a flat mounting region.

As illustrated in FIGS. 17-19, the housing portion 352 has an outer surface 400 with a number of (e.g., three) flat mounting regions 404 spaced apart in 90 degree increments about the central axis. In alternate embodiments (not shown), there may more or fewer flat regions 404 positioned on the housing 348 to mount the lead screw 46 or the lifting handle 408.

Each mounting region 404 is configured to support a lifting handle 408, to be grasped by a user to lift the drive unit 30, or a lead screw mount 412, to threadingly receive the lead screw 46. The handle 408 allows for the drive unit 30 to be a unitary piece, while still being capable of being handled by a single user.

The lead screw 46 threads into the lead screw mount 412 of the drive unit 30 and is secured with a jam nut 416 to fix the lead screw 46 relative to the drive unit 30 (FIG. 12). In the illustrated embodiment, the lead screw 46 is an acme threaded rod that the feed assembly 42 travels along. Additionally, in the illustrated embodiment, the lead screw 46 is mounted to the drive unit 30 by the mount 412 but, in other embodiments, may be mounted to a separate lead screw mounting block secured to the work piece to inhibit relative rotation. In the illustrated embodiment the lead screw 46 has a 12 inch standard axial stroke but, in other embodiments, may have a 24 inch or a 36 inch stroke.

With the illustrated mount for the drive unit 30, the handle 408 and the feed assembly 42 may be mounted in a number of different positions allowing the drive unit 30 to be transported or used in a number of different orientations.

Axial Feed Assembly

As illustrated in FIGS. 20-28, the axial feed assembly 42 includes a housing 428, a cam hub 432 clamped to the bar 14, and a two-lobe cam 436 fixed to the cam hub 432. The bar 14 rotates the cam hub 432 relative to the housing, and the two-lobe cam 436 rotates with the cam hub 432. The two-lobe cam 436 has a cam surface 440 with an elliptical shape having a maximum diameter D1 and a minimum diameter D2. A cam roller 444 is operable to follow the cam surface 440 and is coupled by a pin to a cam roller bracket 448. The cam roller bracket 448 is coupled to a forward cam arm 464 and a reverse cam arm 468. The cam roller bracket 448 is configured to ride on guide shafts 452, 456 secured in the housing 428 with respective shaft bushings 454.

The cam arms 464, 468 are configured to be displaced by the cam roller bracket 448 from a first position to a second position as the cam roller 444 follows the cam surface 440 as the cam 436 rotates. In the first position, the maximum diameter D1 of the cam 436 contacts the cam roller 444 displacing the cam roller bracket 448 and, therefore, the cam arms 464, 468 downwardly (relative to the reference frame of the FIG. 22). In the second position, the minimum diameter D2 contacts the cam roller 444 displacing the cam roller bracket 448 and, therefore, the cam arms 464, 468 upwardly (relative to the reference frame of FIG. 22). With the illustrated cam 436, the cam arms 464, 468 move between the first and second position twice per rotation of the bar 14 (i.e., each rotation of the cam 436 results in two feed strokes). A compression spring 460 coupled between each guide shaft bushing 454 and the cam roller bracket 448 biases the cam roller 444 into contact with the cam surface 440.

The illustrated cam 436 provides a smoother, more continuous feed than using a tripper style of feed system (not shown). In alternate embodiments, a cam 436 having a different shape may be used to provide a different number of feed strokes or a different feed rate.

Figure 21:
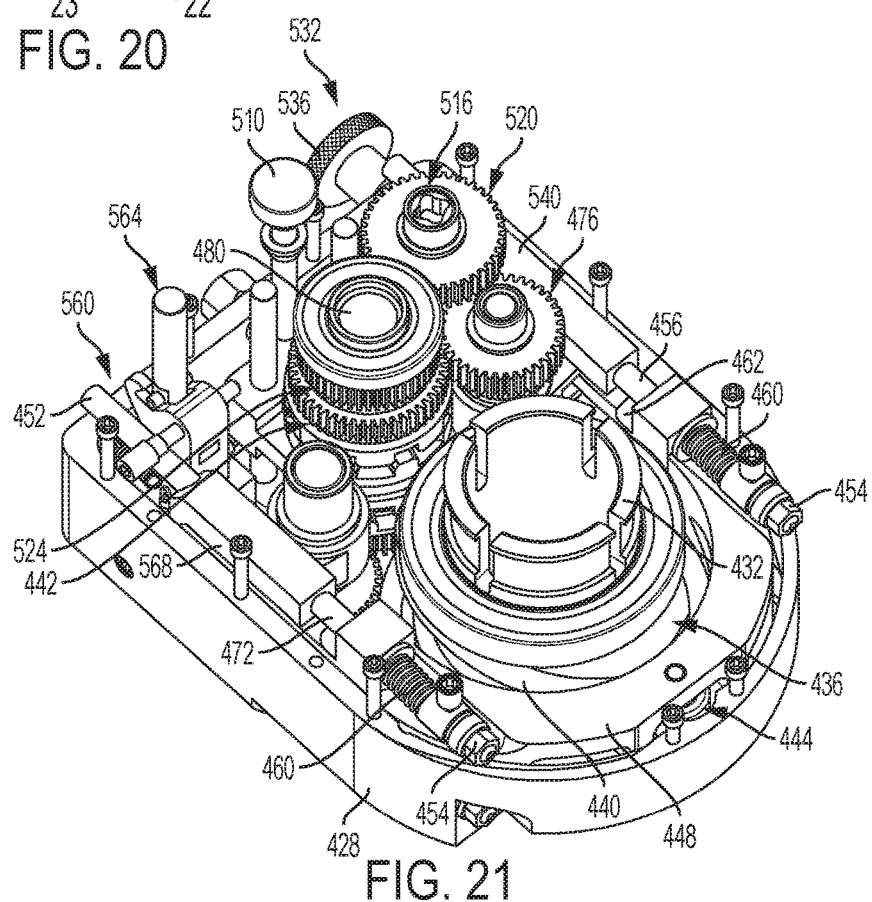
FIG. 21 is a perspective view of the feed assembly of FIG. 20 illustrating a cam and an internal gearing.
Figure 22:
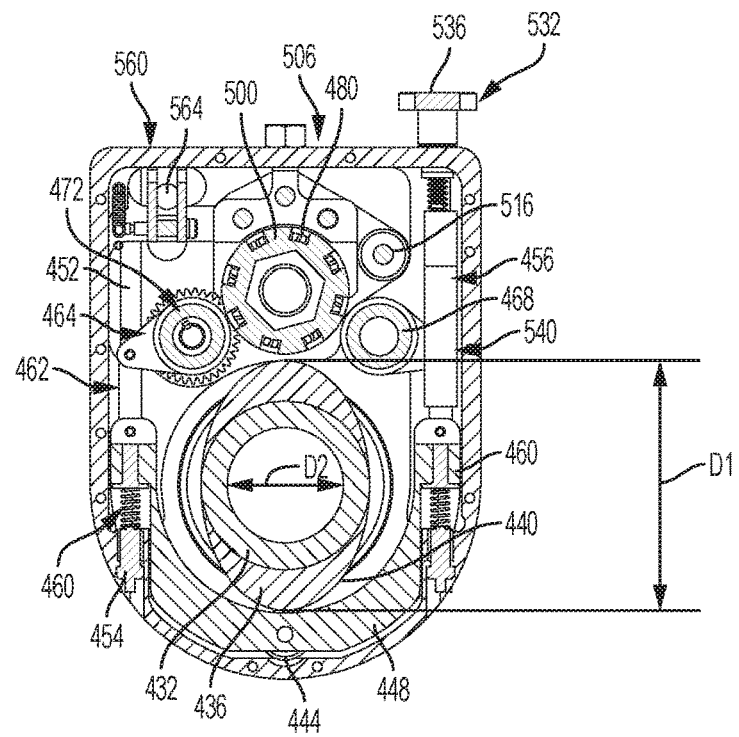
FIG. 22 is a cross-sectional view of the feed assembly of FIG. 20 taken generally along line 22-22.
Figure 28:
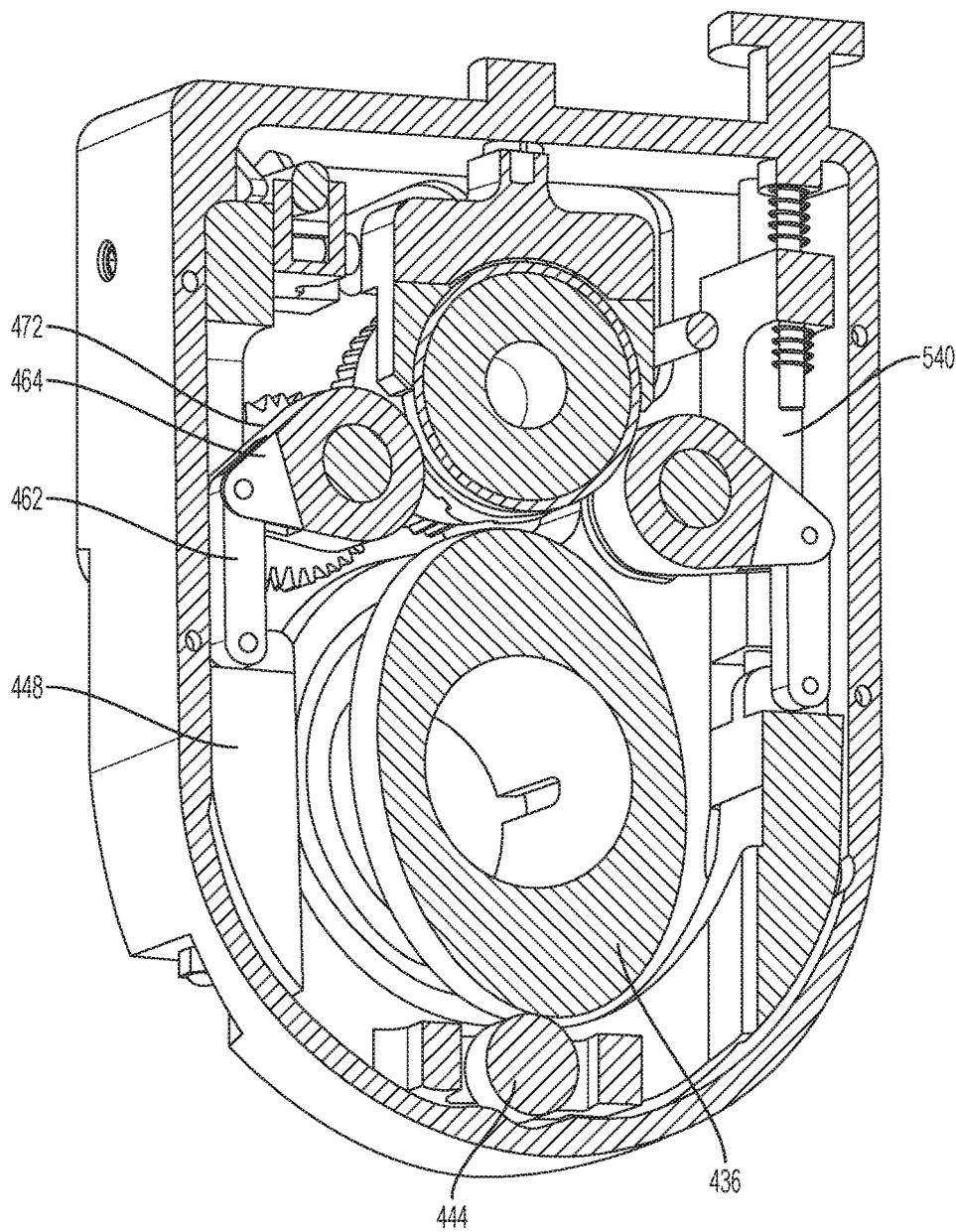
FIG. 28 is a cross-sectional view of the feed assembly of FIG. 20.
Figure 29:
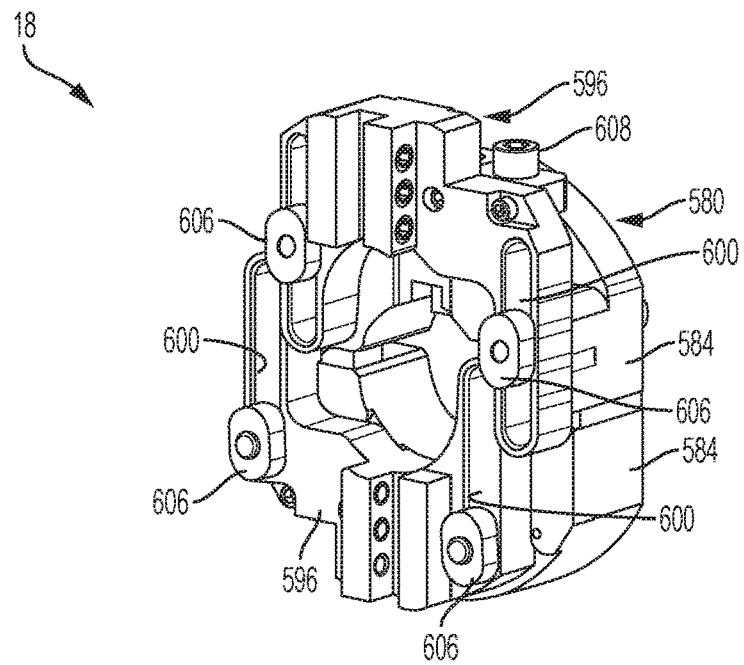
FIG. 29 is a perspective view of a boring head assembly.
Figure 30:
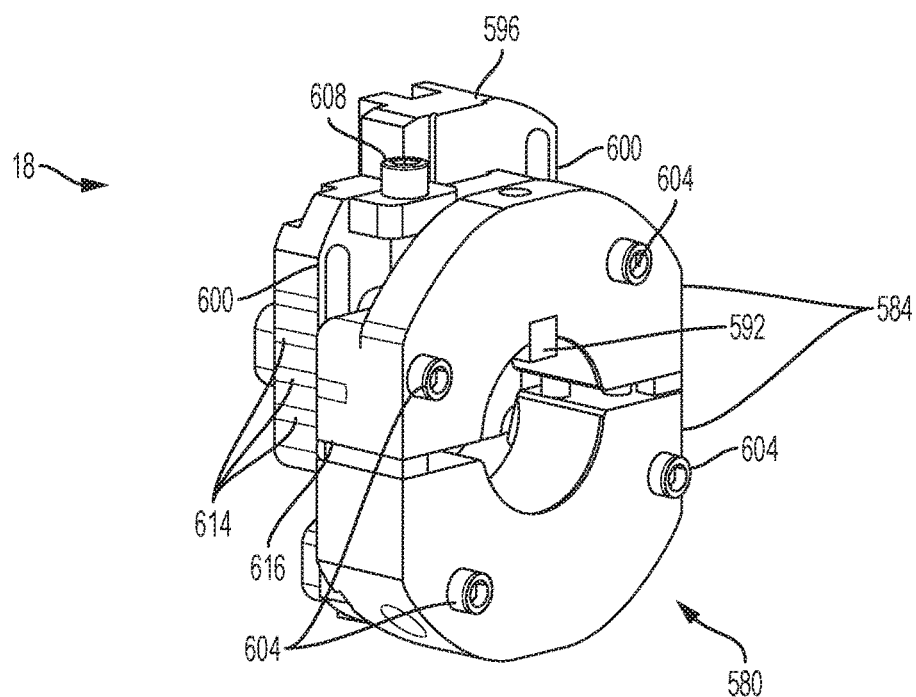
FIG. 30 is a perspective view of the head assembly of FIG. 29.
Figure 31:
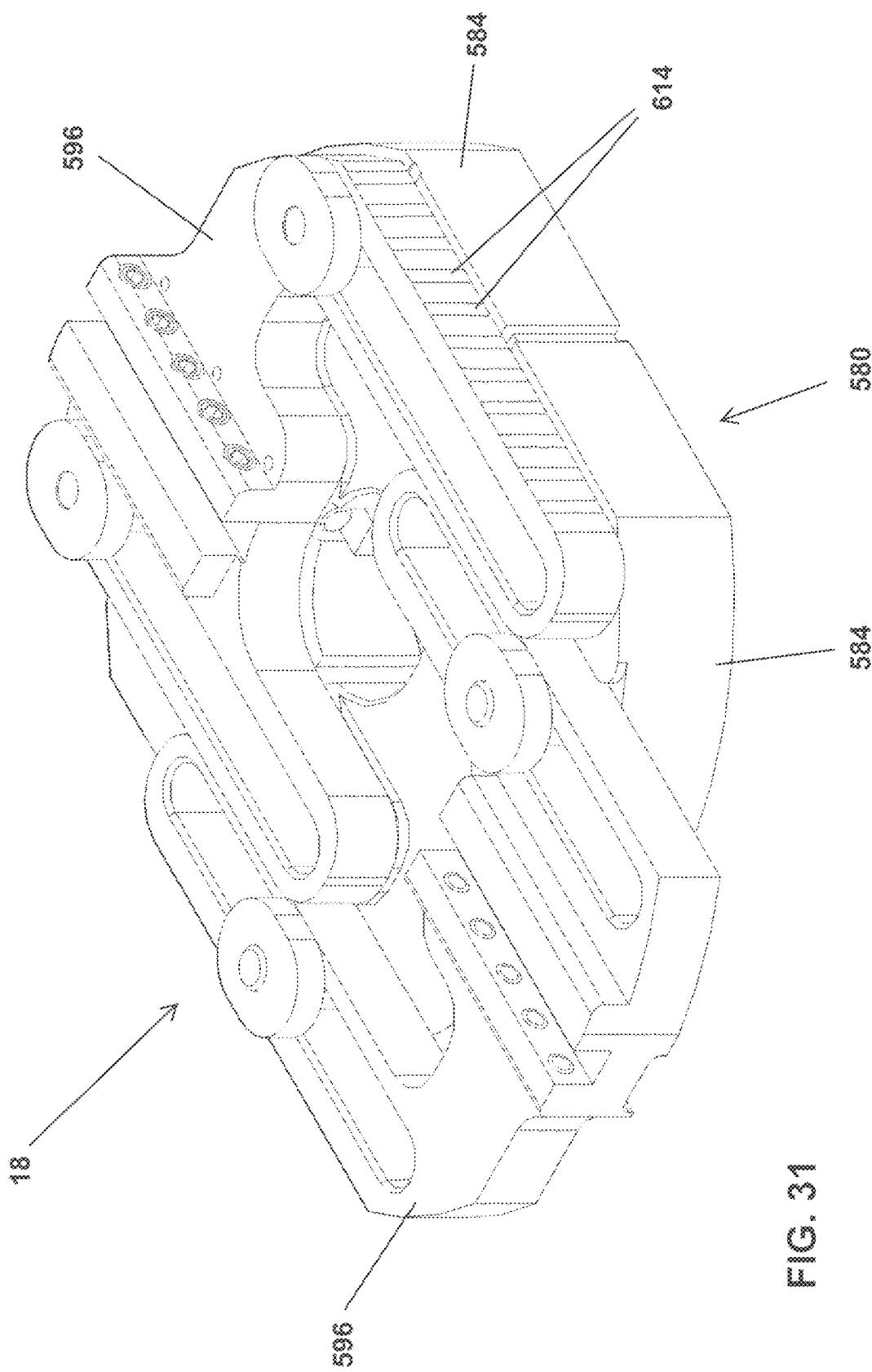
FIG. 31 is a perspective view of the head assembly of FIG. 29.
Figure 32:
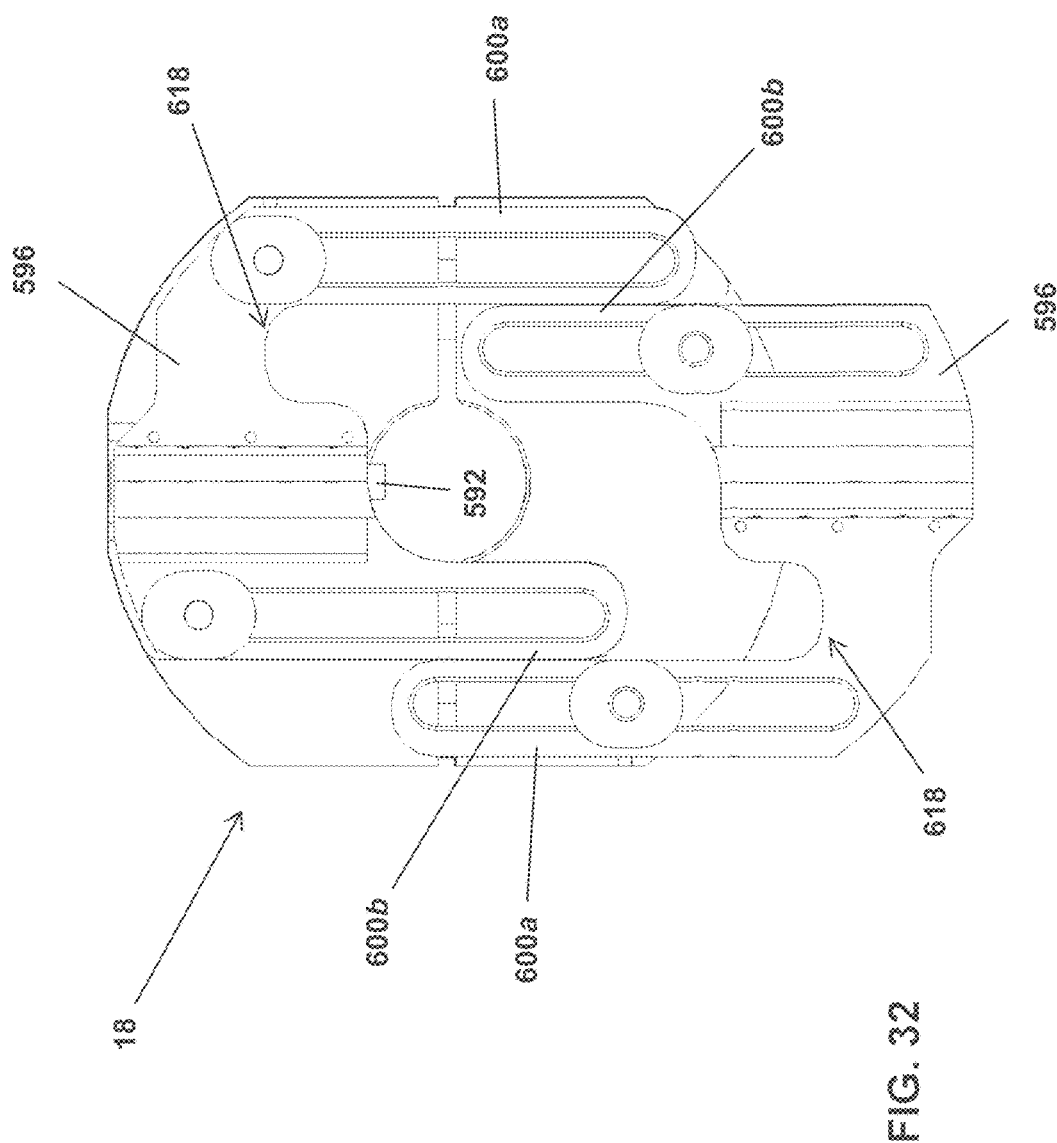
FIG. 32 is a front view of the head assembly of FIG. 29.
Figure 33:
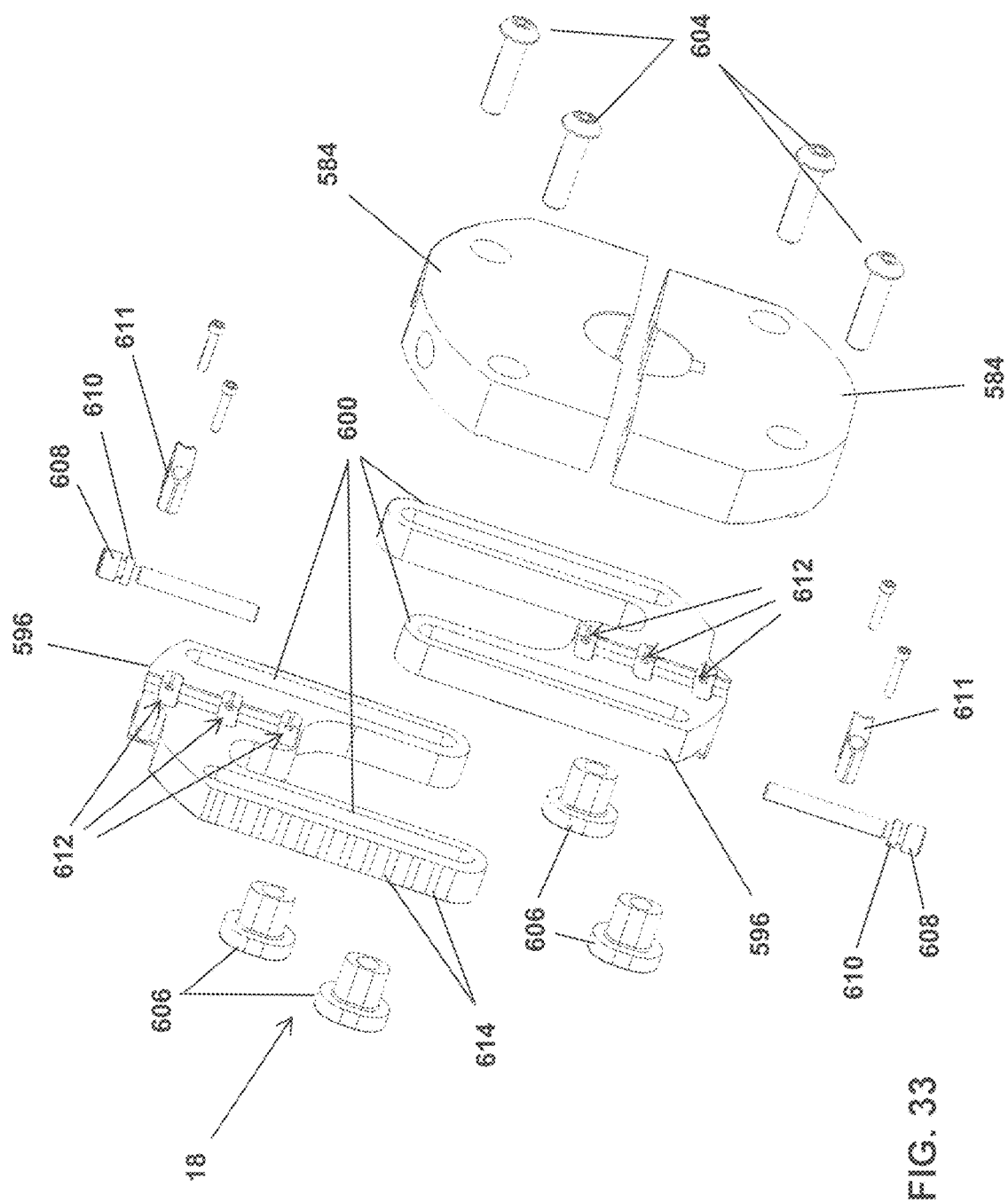
FIG. 33 is an exploded view of a portion of the head assembly of FIG. 29.
Figure 34:
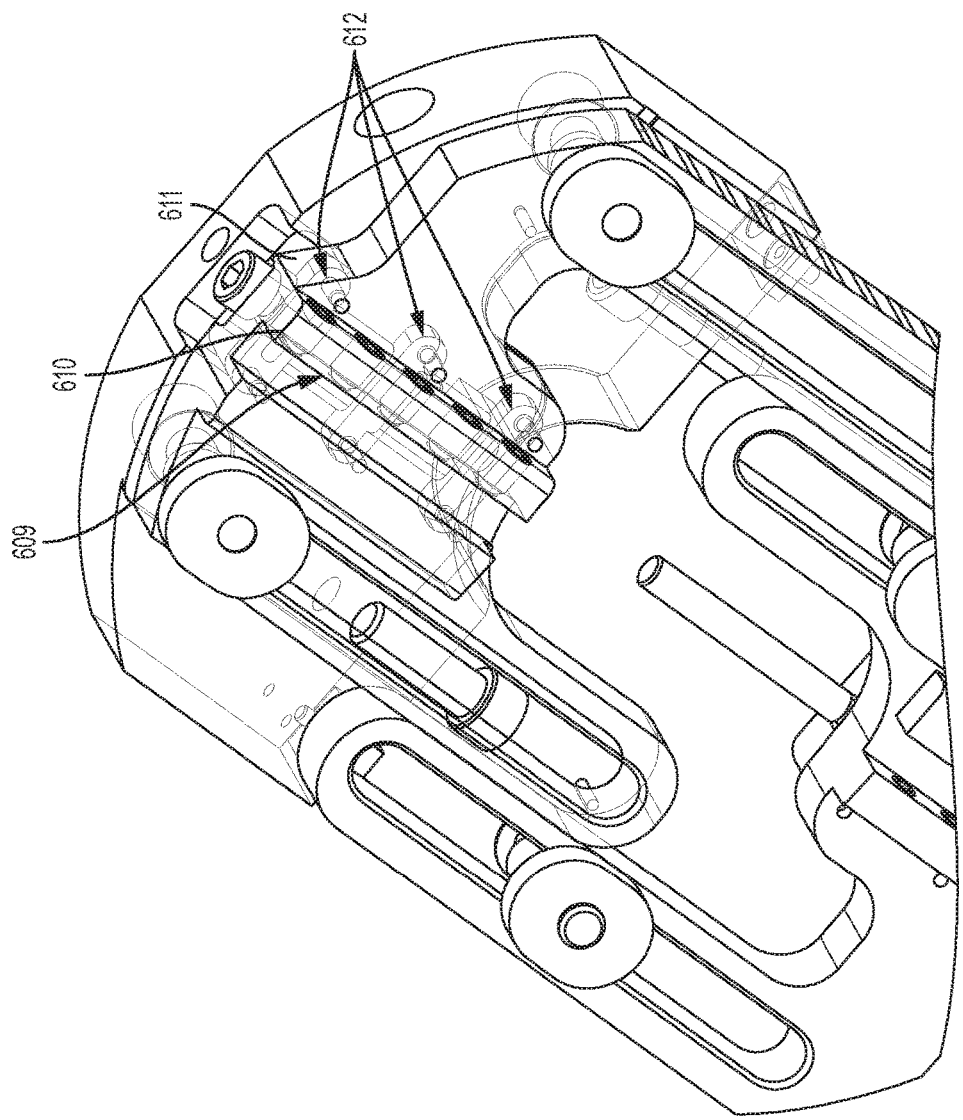
FIG. 34 is an enlarged cross-sectional view of a portion of the head assembly of FIG. 29 with a tool holder illustrated as transparent.
Figure 35:
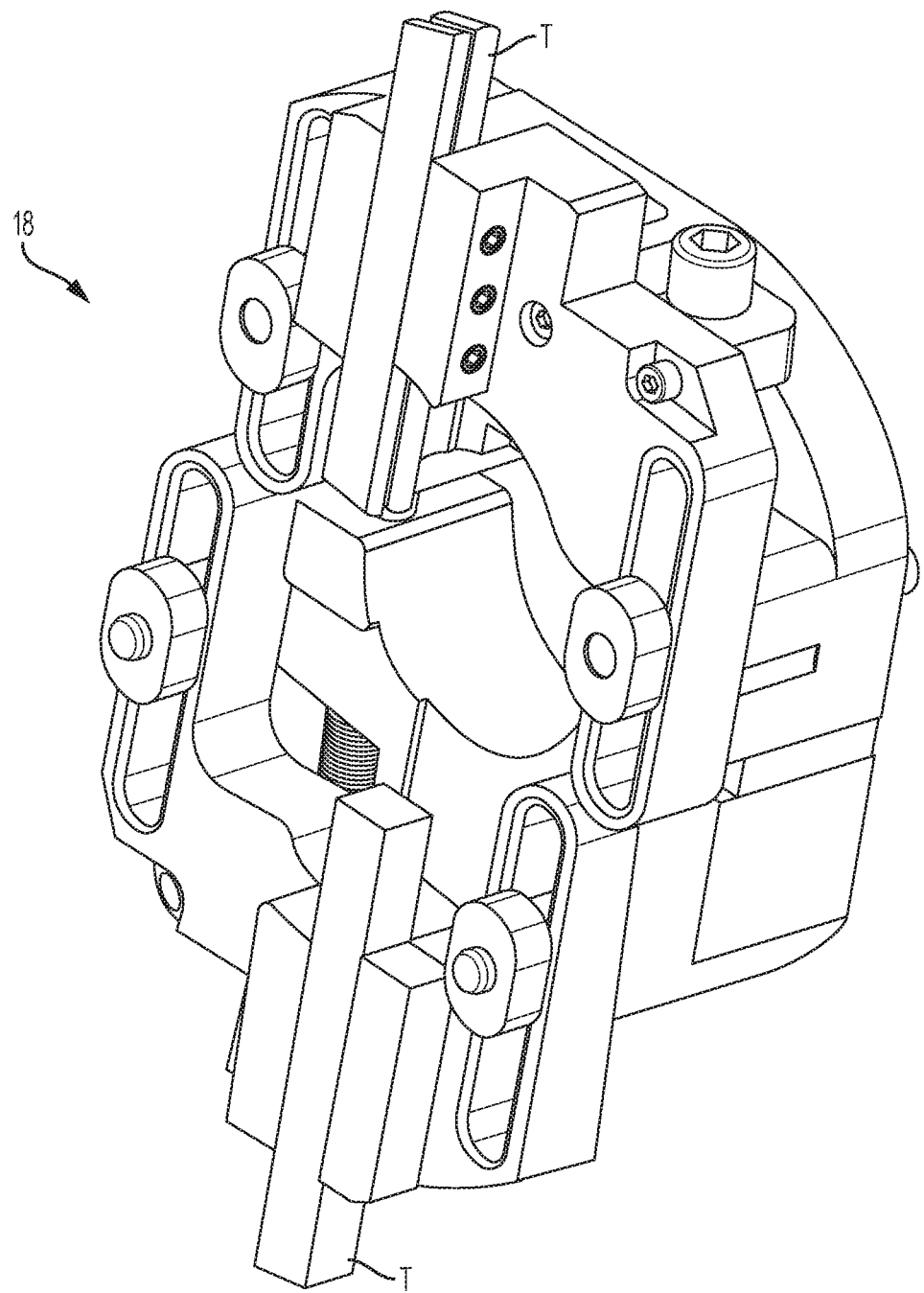
FIG. 35 is a perspective view of the head assembly with tool bits.

Each cam arm 464, 468 is coupled to the cam roller bracket 448 by a linkage 462 (one shown in FIG. 21 and the other shown in FIG. 22; see also FIG. 28). The forward cam arm 464 and the reverse cam arm 468 are connected to a forward drive gear 472 and a reverse drive gear 476, respectively. Each drive gear 472, 476 has a one-way clutch so that, as the forward cam arm 464 and the reverse cam arm 468 oscillate, the gears 472, 476 only rotate in one direction.

Figure 23:
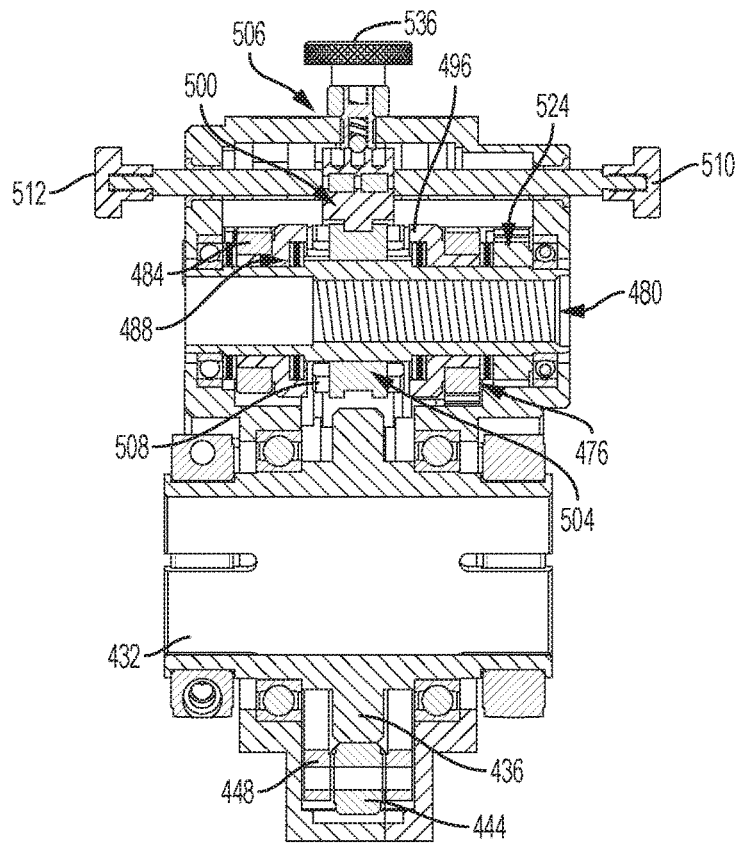
FIG. 23 is a cross-sectional view of the feed assembly of FIG. 20 taken generally along line 23-23.
Figure 24:
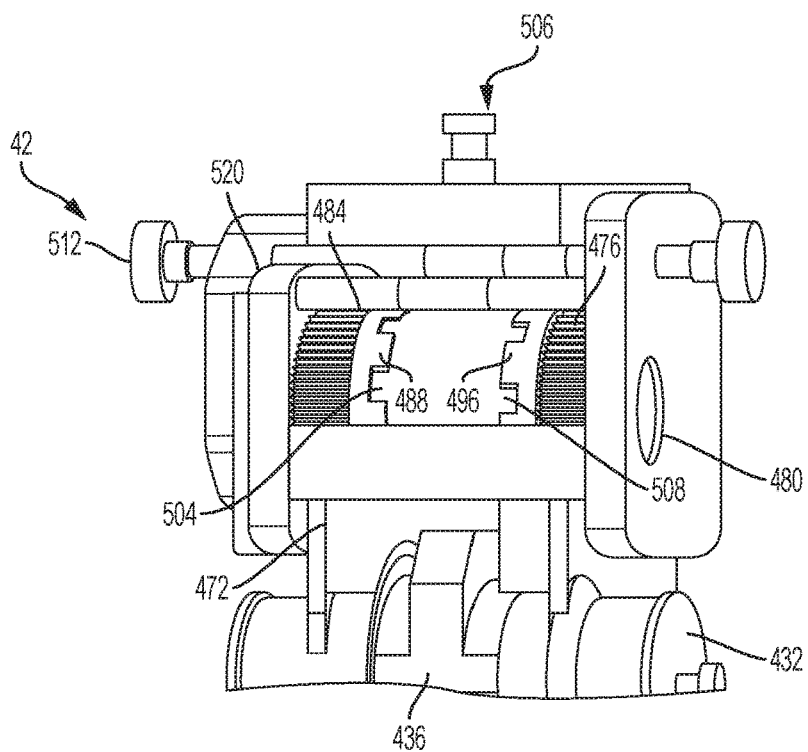
FIG. 24 is a cross-sectional view of a portion of the feed assembly of FIG. 20.

With reference to FIGS. 23-24, a feed nut 480 is mounted to rotate about the lead screw 46 relative to the housing 428. A forward idler gear 484 is keyed onto a forward shifter hub 488, and a reverse idler gear 492 is keyed onto a reverse shifter hub 496. The hubs 488, 496 are each configured to spin freely on the feed nut 480 but are fixed axially along the feed nut 480. The forward idler gear 484 meshes with the forward drive gear 472, and the reverse idler gear 492 meshes with the reverse drive gear 476. As the reverse drive gear 476 and the forward drive gear 472 rotate, the forward idler gear 484 and the reverse idler gear 492 rotate.

A main shifter hub 500 has an internal hex bore configured to fit onto the feed nut 480 and to engage with a hex cross-section portion of the feed nut 480 so that the main shifter hub 500 transmits rotation to the feed nut 480. The main shifter hub 500 has a first end 504 to selectively engage the forward shifter hub 488 and a second end 508 to selectively engage the reverse shifter hub 496. The main shifter hub 500 is coupled to a shaft having a forward knob 510 and a reverse knob 512.

The main shifter hub 500 is movable between a neutral position, a forward position and a reverse position. In the neutral position, neither the forward shifter hub 488 nor the reverse shifter hub 496 engages the main shifter hub 500 so that the feed nut 480 does not rotate.

In the forward position, the forward shifter hub 488 engages the first end 504 of the main shifter hub 500 so that the feed nut 480 is rotated in a first rotational direction on the lead screw 46 during rotation of the bar 14. This causes the feed assembly 42 and the bar 14 to travel linearly in a first direction relative to the workpiece.

In the reverse position, the reverse shifter hub 496 engages the second end 508 of the main shifter hub 500 so that the feed nut 480 is rotated in a second rotational direction on the lead screw 46 during rotation of the bar 14. This causes the feed assembly 42 and the bar 14 to travel linearly in a second direction opposite to the first direction relative to the workpiece.

In the neutral position of the shifter hub 500, depressing the forward knob 510 moves the main shifter hub 500 to the forward position while depressing the reverse knob 512 moves the main shifter hub 500 to the reverse position. While in the forward position or the reverse position, depressing the reverse knob 512 and the forward knob 510, respectively, moves the main shifter hub 500 to the neutral position.

An axial feed locking system 506 locks the feed assembly 42 in a selected position (e.g., neutral, forward or reverse) depending on the current condition of the feed assembly 42. In the illustrated embodiment (see FIG. 23), the locking system 506 includes a spring and a ball detent arrangement. The main shifter hub 500 includes recesses corresponding to the forward, neutral, and reverse positions. The spring biases the ball into one of the recesses to lock the main shifter hub 500 in a selected one of the forward, neutral, and reverse positions. Pulling the forward knob 510 or the reverse knob 512 moves the main shifter hub 500 and causes the spring to bias the ball into one of the recesses. In some constructions, a spring plunger may be provided, alternatively or additionally, to adjust the locking system 506.

Figure 20:
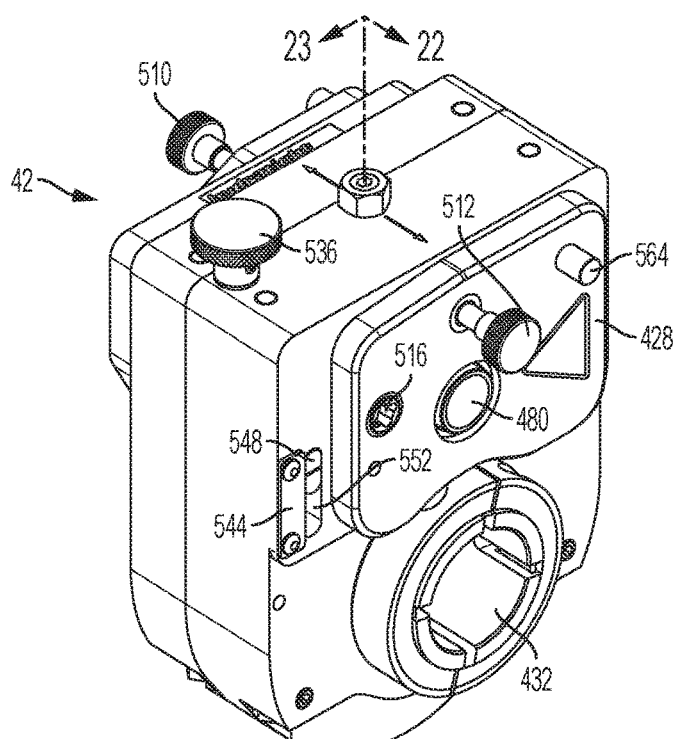
FIG. 20 is a perspective view of an axial feed assembly.

As illustrated in FIGS. 20-21 and 23, the feed assembly 42 further includes a manual feed drive shaft 516, a first manual feed gear 520 fixed to the manual feed drive shaft 516, and a second manual feed gear 524 fixed to the feed nut 480. The first manual feed gear 520 meshes with the second manual feed gear 524. Turning the manual feed drive shaft 516 rotates the manual feed gear 520 which, in turn, rotates the feed gear 524 and the feed nut 480. Rotating the manual feed drive shaft 516 in one direction (e.g., clockwise) advances the feed nut 480 in a first direction on the lead screw 46 to move the bar 14 in the first direction. Rotating the manual feed drive shaft 516 in the opposite direction (e.g., counterclockwise) advances the feed nut 480 in a second direction on the lead screw 46 moving the bar 14 in the second direction.

The manual feed drive shaft 516 is configured to be turned by a shaped key. However, in alternate embodiments, the manual feed drive shaft 516 may have a knob configured to be manually turned to drive the manual feed drive shaft 516.

Figure 25:
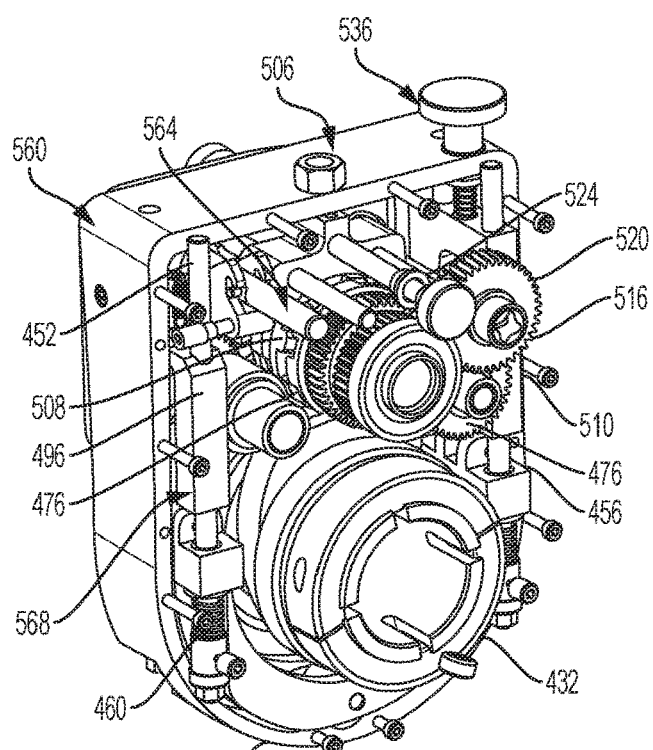
FIG. 25 is a perspective view of the feed assembly of FIG. 20 illustrating an axial stop and an axial feed control.

With reference to FIGS. 20-21 and 25, an axial feed control 532 adjustably changes the feed rate by limiting how far the cam roller 444 can travel with the cam 436, thereby limiting the rotation of the forward cam arm 464 and the reverse cam arm 468. An axial feed control knob 536 moves a control bracket 540 along the guide shafts 452, 456. The control bracket 540 inhibits movement of the cam roller bracket 448, and a distance between the control bracket 540 and the cam roller bracket 448 determines how far the cam roller bracket 448 can be displaced by the compression spring 460.

When rotated in a first direction, the knob 536 moves the control bracket 540 down the guide shafts 452, 456 towards the cam roller bracket 448 to limit the range of movement of the cam roller bracket 448 and thereby decrease the feed rate. When rotated in a second direction, the knob 536 moves the control bracket 540 up the guide shafts 452, 456 away from the cam roller bracket 448, increasing the range of movement of the cam roller bracket 448 and the feed rate. The feed rate can thus be decreased or increased by adjusting the distance between the control bracket 540 and the cam roller bracket 448.

The axial feed control 532 may be used for setting the axial feed rate to, for example, between 0 and 0.019 inches of travel per revolution. It should be understood that, in other constructions (not shown), the axial feed rate and range may be different (e.g., between 0 and about 0.029 inches of travel per revolution or more).

Figure 26:
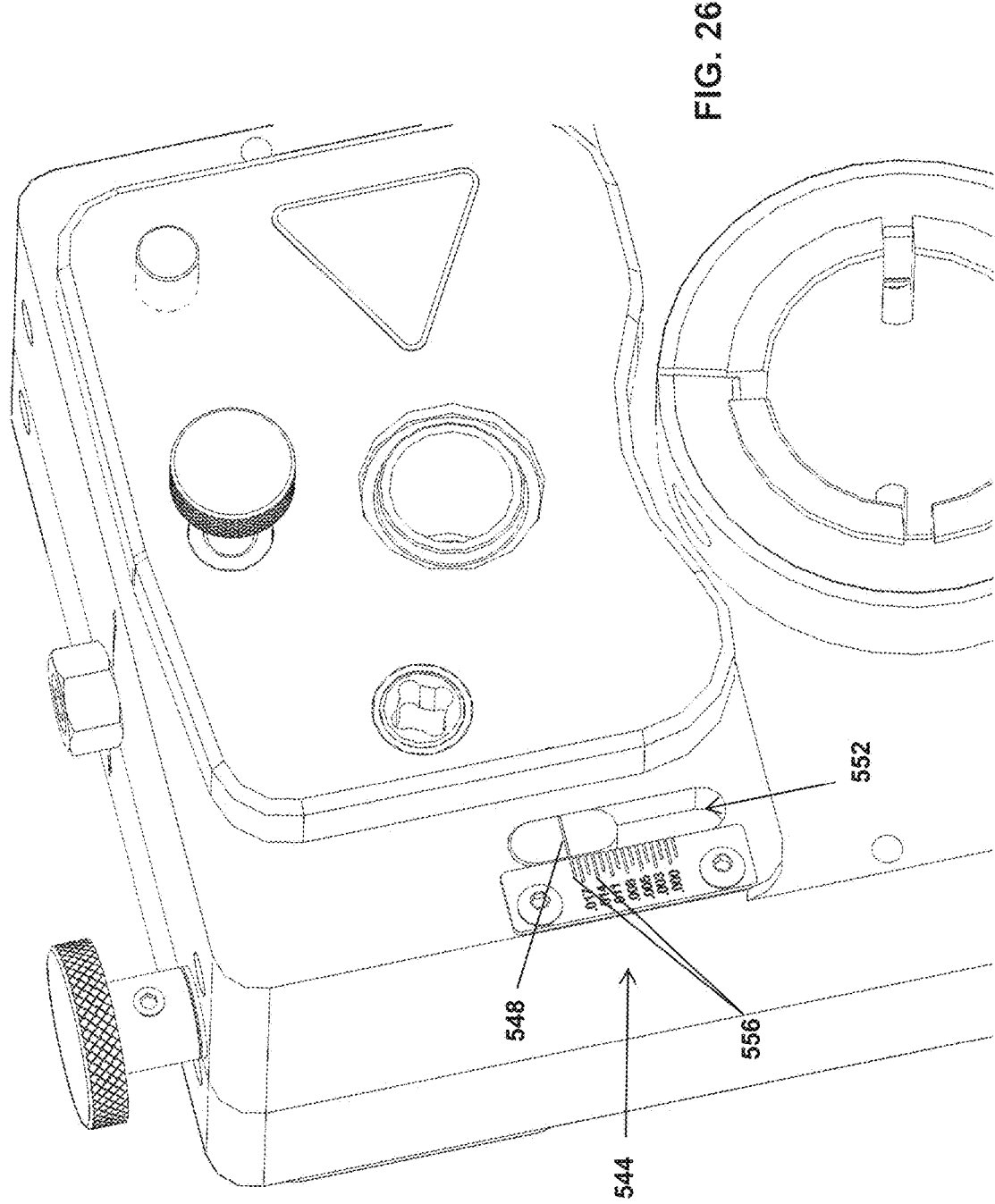
FIG. 26 is an enlarged view of a portion of the feed assembly of FIG. 20 illustrating the feed gage.
Figure 27:
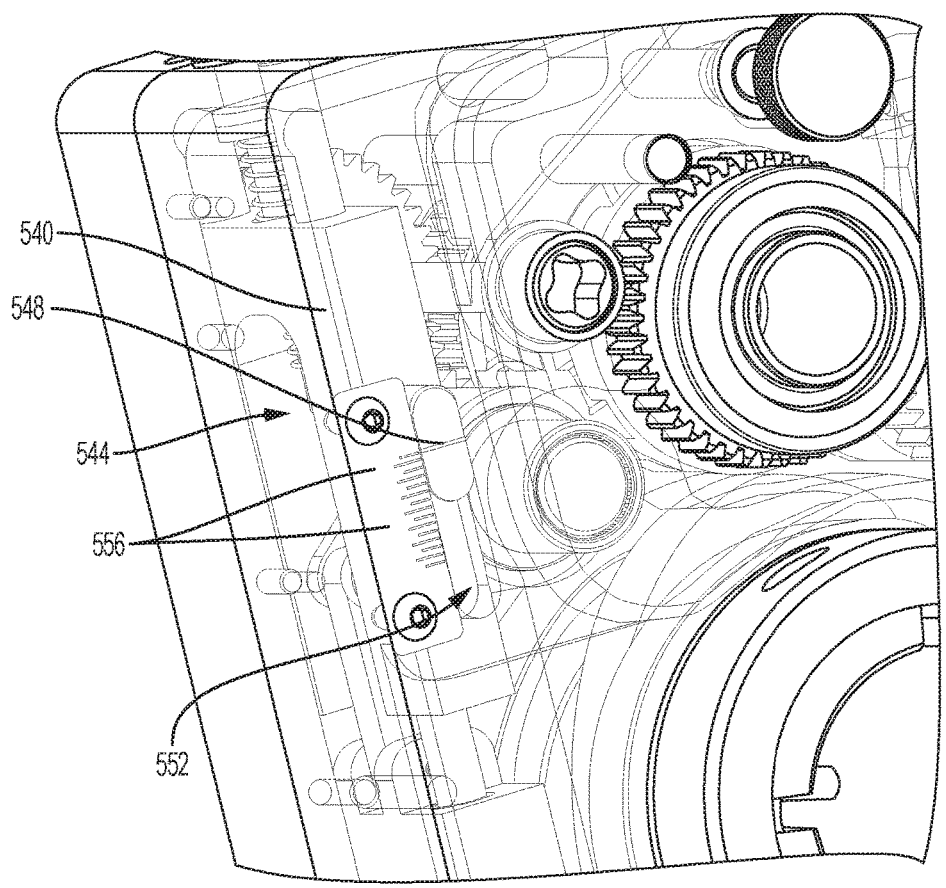
FIG. 27 is an enlarged view of the portion of the feed assembly in FIG. 26 with a portion of the housing illustrated as transparent.

The set feed rate can be read by a user on a feed rate indicator 544 (see FIGS. 26-27). The feed rate indicator 544 includes an indicator 548 moving linearly within a slot 552 as the control bracket 540 is adjusted to indicate to the user how far the bar 14 moves axially with each rotation of the bar 14. As shown in FIG. 27, the indicator 548 is connected to and moves with the control bracket 540 as the control bracket 540 is adjusted. As discussed above, the adjusted position of the control bracket 540 sets the range of movement of the cam roller bracket 448 and the associated feed rate (for a given cam 436). The position of the indicator 548 corresponds to the position of the control bracket 540 and is indicative of the feed rate. As shown in FIGS. 26-27, a number of second indicator members 556 are provided along the slot 552. The position of the indicator 548 relative to one or more of the indicators 556 shows the feed rate to the user (e.g., about 0.020 inches of travel per revolution (as shown in FIGS. 26-27).

With reference to FIGS. 20-21 and 25, an automatic stop system 560 functions similar to the axial feed control 532 and includes an automatic stop shaft 564 protruding from opposite sides of the housing 428. When actuated, the stop shaft 564 causes a feed stop bracket 568 to be displaced down the guide shafts 452, 456. The feed stop bracket 568 urges the cam roller bracket 448 down so that the cam roller 444 does not contact the cam 436. In this condition, no feed can occur, and axial travel is inhibited.

Axial stopping members 570 are clamped on the lead screw 46 (FIG. 12). Each stop member 570 is configured to engage and automatically actuate the automatic stop shaft 564 to prevent further axial movement beyond the established limit.

In operation, the feed assembly 42 is fixed to the bar 14 by clamping the bar 14 within the cam hub 432. The lead screw 46 is then threaded through the feed nut 480.

While the main shifter hub 500 is in the neutral position and the bar 14 is rotating, the feed assembly 42 remains fixed and no axial motion occurs. Actuating the forward knob 510 causes the main shifter hub 500 to engage the forward shifter hub 488, thereby causing the feed nut 480 to rotate in the first direction (i.e., clockwise). This causes the feed assembly 42 to travel along the lead screw 46 in a forward direction (e.g., toward the workpiece). Actuating the reverse knob 512 causes the first end 504 of the main shifter hub 500 to engage the reverse shifter hub 496, thereby causing the feed nut 480 to rotate in the second direction (i.e., counter-clockwise). This causes the feed assembly 42 to travel along the lead screw 46 in a reverse direction (e.g., away from the workpiece). Actuating the automatic stop shaft 564, manually or by contact with one of the pair of stopping members 570, causes the feed stop bracket 568 to urge the cam roller bracket 448 and the cam roller 444 out of contact with the cam 436, thereby inhibiting axial movement of feed assembly 42 and the bar 14.

In operation of the axial feed control 532, rotating the axial control knob 536 in the first direction moves the control bracket 540 toward the cam roller bracket 448, thereby shortening the distance between the control bracket 540 and the cam roller bracket 448. This decreases the feed rate of the feed assembly 42. Rotating the axial control knob 536 in the second direction moves the control bracket 540 away from the cam roller 448, thereby lengthening the distance. This increases the feed rate of the feed assembly 42.

When the main shifter hub 500 is in neutral, the manual feed drive shaft 516 is operable to be rotated. Rotating the manual feed drive shaft 516 clockwise causes the first manual feed gear 520 to engage the second manual feed gear 524. This causes the feed nut 480 to advance in the first direction on the lead screw 46 toward the workpiece. Rotating the manual feed drive shaft 516 counter-clockwise causes the feed nut 480 to move in the second direction on the lead screw 46 away from the workpiece.

Boring Head Assembly

As illustrated in FIGS. 29-37, the head assembly 18 includes a body 580 with first and second halves 584 configured to be clamped onto the bar 14 by tightening a pair of bolts (not shown) to bring the body halves 584 together. One body half 584 includes a key 592 engaging the keyway of the bar 14 to rotationally fix the head assembly 18 to the bar 14, and prevent the head assembly 18 from spinning on the bar 14. The head assembly 18 may be positioned anywhere along the bar 14.

First and second tool holders 596 are each configured to receive (see FIGS. 35-37) a tool bit T mounted radially for removing material from the bore of the workpiece. Each tool holder 596 has a pair of slots defined in slot portions 600 receiving a clamp bolt 604 that threads into a clamp member 606 to couple the first and second tool holders 596 to the first and second boring head halves 584, respectively.

The tool holders 596 are each independently radially adjustable relative to the corresponding body halves 584 by turning a radial adjustment screw 608. The screws 608 are threaded into (see FIG. 34) corresponding bores 609 in the body halves 584. The screws 608 have an annular ridge 610 captured by a carrier 611 which is pinned to the associated tool holder 596. Turning each screw 608 threads the screw 608 into and out of the bores 609 and independently moves the associated tool holder 596 radially relative to the body half 584. This arrangement also provides fine adjustment of the radial position of the tool holder 596 and the tool T.

To provide rough adjustment, each carrier 611 can be connected to the associated tool holder 596 in a number of different radial starting positions 612 (e.g., three shown). From a selected "rough" radial position, the radial position of the tool holder 596 and the tool T can be further adjusted (and more finely adjusted) by the adjustment screw 608.

A series of indicators 614 are located on the tool holders 596 and cooperate with an indicator 616 on the associated boring head half 584 so that, as each tool holder 596 is moved, the position is indicated and can be noted. Each tool holder 596 is retained in the selected radial position by the clamp bolts 604 and clamp members 606 received by the pair of slots 600.

The tool holders 596 are configured to have a nesting shape so that, in radially-inward positions, at least a portion of the slot portions 600 of the tool holders 596 can overlap. The tool holders 596 slide parallel to one another between overlapping radially-inward positions and non-overlapping radially-outward positions. In the illustrated construction, each tool holder 596 has an outer slot portion 600a and an inner slot portion 600b and defines a recess 618 for receiving the inner slot portion 600b of the other tool holder 596 in radially-inward positions of the tool holders 596. The nesting shape of the tool holders 596 allows the head assembly 18 to maximize boring diameter ranges.

Figure 36:
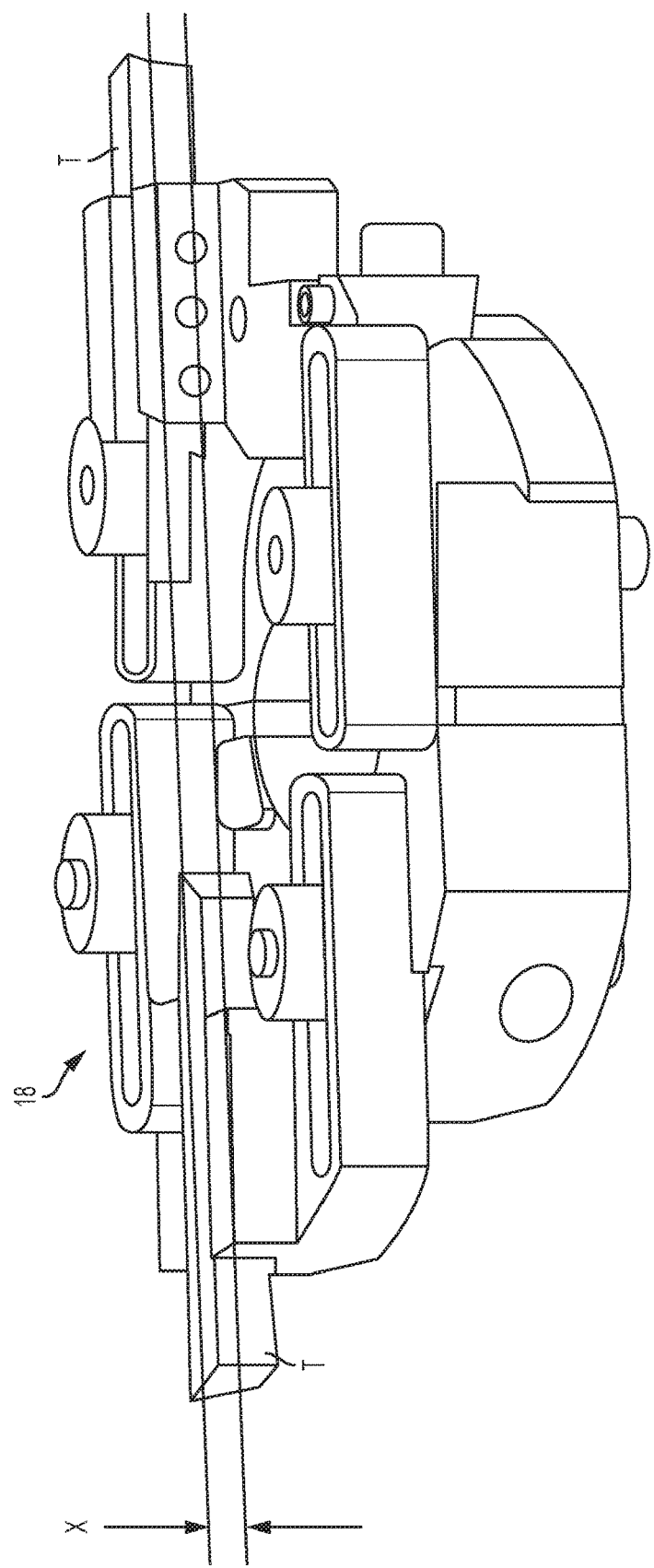
FIG. 36 is a perspective view of the head assembly of FIG. 35 and illustrating an offset of the tool bits.
Figure 37:
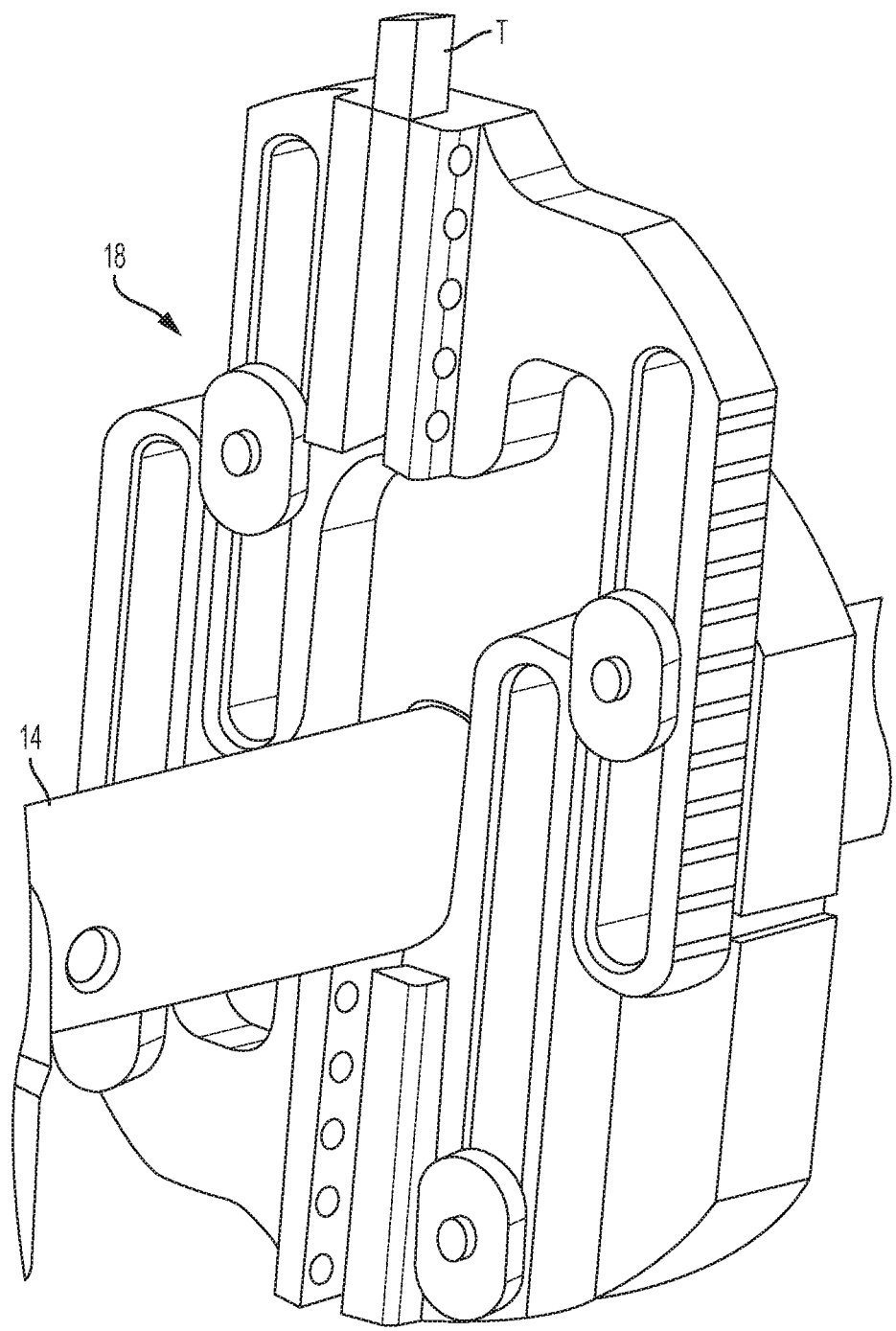
FIG. 37 is a perspective view of the head assembly supported on a boring bar.
Figure 38:
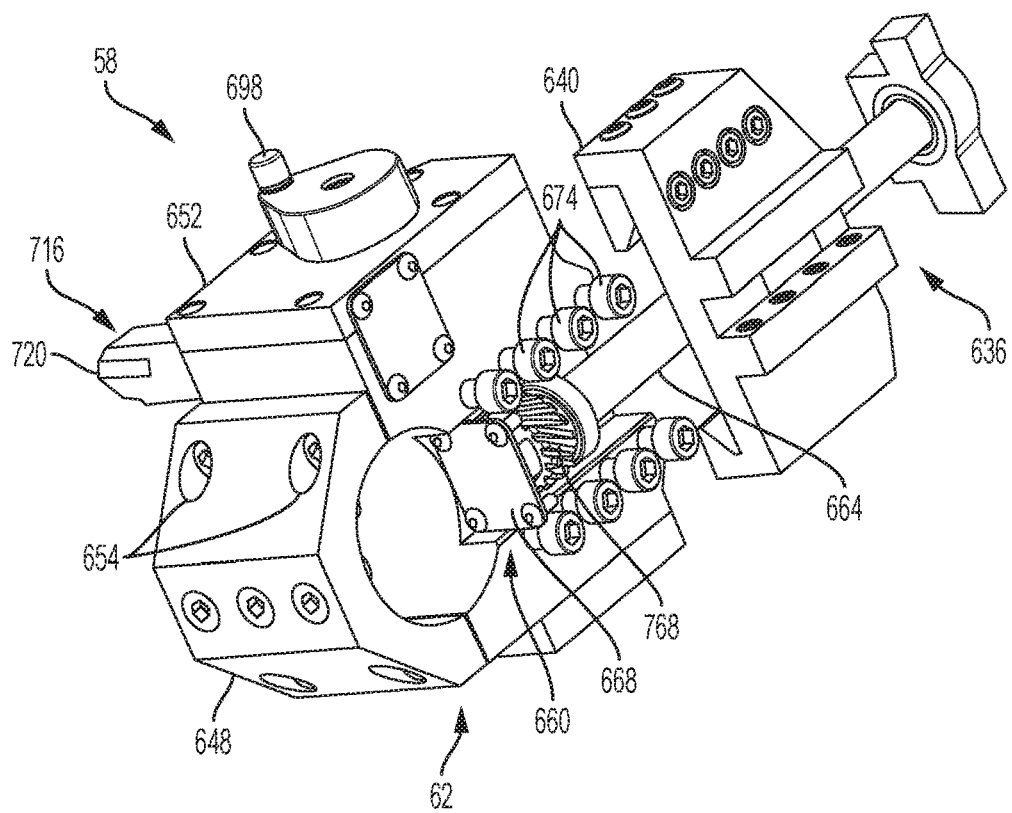
FIG. 38 is a perspective view of a facing assembly.

As shown in FIG. 36, the tool bits T (and the associated tool holders 596) are configured to be axially offset by an amount X (e.g., by ⅛ inch) so that one of the tool bits T cuts ahead of the other, allowing for an increased (up to two times) material removal rate compared to one tool holder 596 or axially aligned tool holders 596.

Having evenly-spaced tool holders 596 (e.g., two tool holders 596 spaced apart 180°) may assist in balancing the head assembly 18 during rotation of the bar 14. The head assembly 18 may be of different sizes or be configured to receive tool holders of different sizes to vary the boring diameter of the head assembly 18.

In the illustrated embodiment, a combination of different sized tool holders 596 and nesting capability allows for a standard boring range of approximately 2.5 to 24.0 inches. More specifically, one tool (½ inch square cutting tools) installed in the bar 14 allows for a boring range of 2.5 to 4.5 inches, a small boring head allows for a boring range of 4.5 to 6.0 inches, a mid-range boring head allows for a boring range of 6.0 to 10.0 inches, and a large boring head allows for a boring range of 10.0 to 24.0 inches. An optional micrometer adjustable boring head has a boring range of 5.96 to 12.75 inches. A maximum depth of cut may be about 0.125 inches per side.

In operation, to accurately position the tool holders 596 on the boring head halves 584, the clamp members 606 are loosened by turning the clamp bolts 604 on the back of the head halves 584. Once the clamp bolts 604 are loosened, the carrier 611 is pinned in the selected rough position 612, and the screw 608 may be rotated to move the associated tool holder 596 radially. The series of indicators 612 on each tool holder 596 and the indicator 616 on the associated boring head half 584 are used to align the tool holders 596 the same radial distance from the axis A of the bar 14.

Facing Assembly

As illustrated in the FIGS. 38-41, the facing assembly 58 includes a facing head 62, a facing arm 636, and a tool holder 640 configured to hold a facing tool bit (not shown). The facing head 62 includes a bottom housing 648 and a top housing 652 configured to be clamped onto the bar 14. Four bolts 654 connect the housings 648, 652. The bottom housing 648 includes a key 656 that fits into the keyway of the bar 14 so that the facing assembly 58 rotates with the bar 14. The facing head 62 may be positioned anywhere axially along the length of the bar 14.

The facing arm 636 is connected to the top housing 652 at a first proximal end 660 of the facing arm 636 and configured to extend perpendicularly away from the axis A of the bar 14. The tool holder 640 is mounted on the facing arm 636 to slide along the facing arm 636. A radial feed screw 664 having a longitudinal axis C is supported on the facing arm 636 for rotation about the axis C. The feed screw 664 is threaded into a feed nut 668 fixed to the tool holder 640 and configured so that, as the feed screw 664 rotates, the tool holder 640 moves linearly along the facing arm 636.

A gearing assembly 672 enclosed by the top housing 652 transfers rotation of the bar 14 to rotation of the feed screw 664, resulting in radial feed of the tool holder 640 along the facing arm 636. As the bar 14 rotates, the facing tool bit (not shown) contacts the workpiece to perform a facing operation.

The facing arm 636 may be replaced with a facing arm 636 of a different length, the length of the facing arm 636 depending on the amount of radial travel of the tool holder 640 that is required. The facing arm 636 may be changed to a longer or shorter arm by removing eight socket head bolts 674 that connect the facing arm 636 to the top housing 652.

Figure 39:
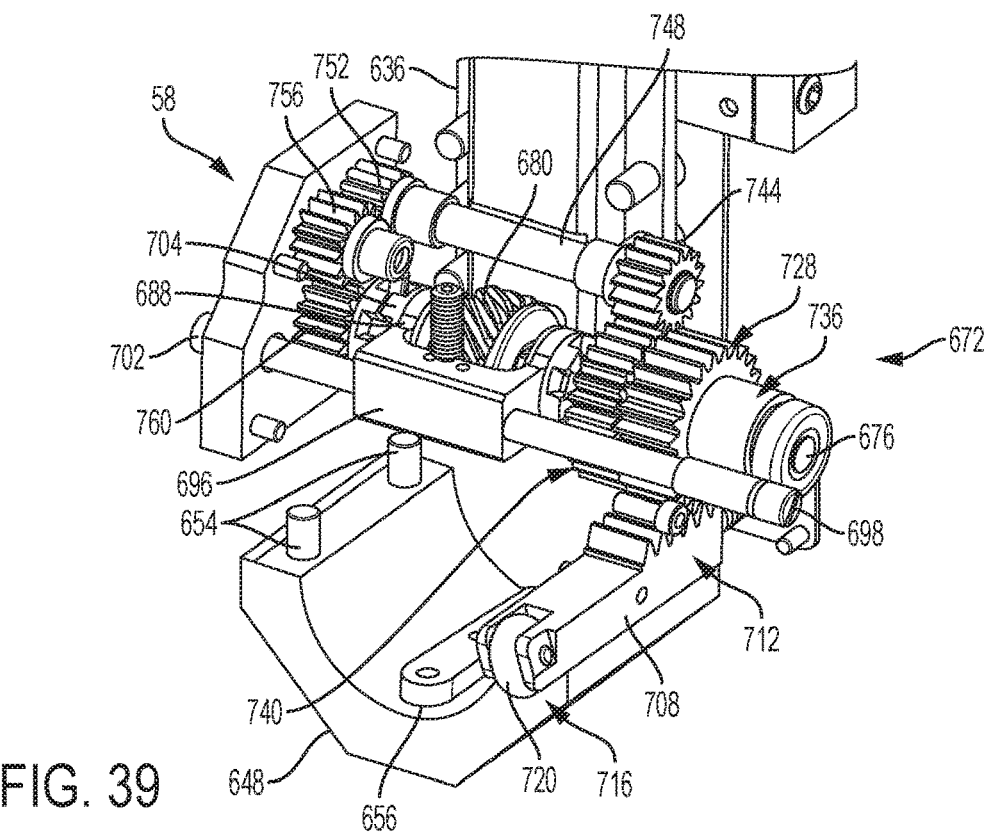
FIG. 39 is a perspective view of a portion of the facing assembly of FIG. 38 illustrating a gearing assembly.
Figure 40:
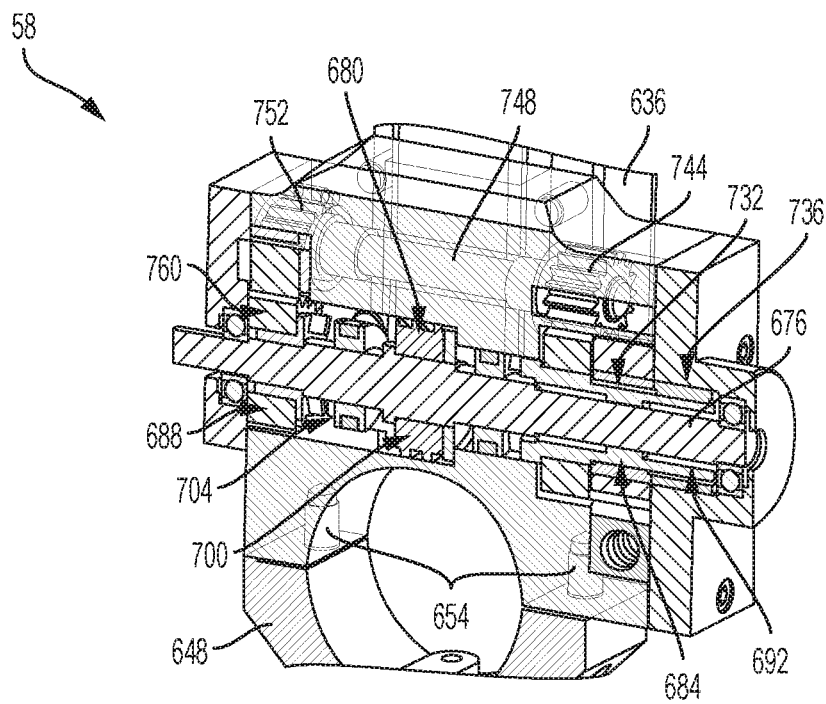
FIG. 40 is a cross-sectional view of a portion of the facing assembly of FIG. 38 illustrating a drive shaft.
Figure 41:
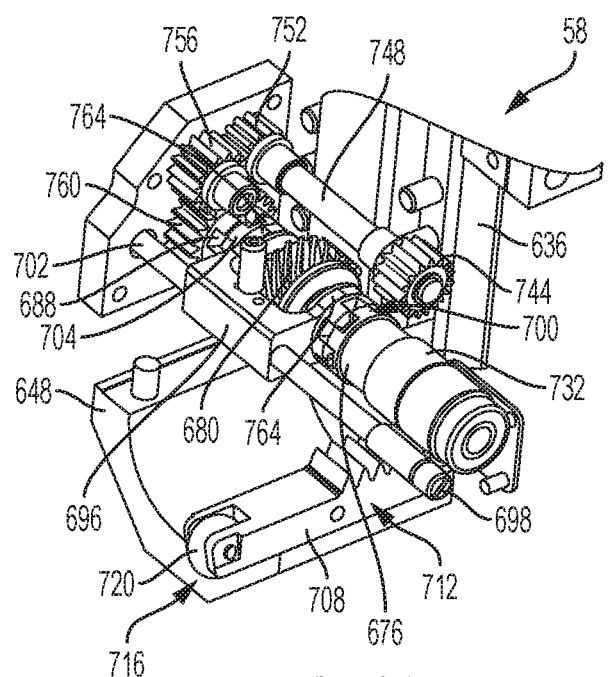
FIG. 41 is a perspective view of a portion of the facing assembly of FIG. 38 illustrating the gearing assembly of FIG. 39.

With reference to FIGS. 39-41, the gearing assembly 672 includes a drive shaft 676 having a longitudinal axis D and rotatably mounted in the top housing 652, a first helical gear 680 fixed to the drive shaft 676, a long shifter hub 684, a short shifter hub 688, and a shifter 696. The long shifter hub 684 is mounted on the drive shaft 676 by a bushing 692 for rotation relative to the drive shaft 676. The shifter 696 is operable to selectively engage a forward shifter hub 700 and a reverse shifter hub 704 with the long shifter hub 684 and the short shifter hub 688, respectively.

The gearing assembly 672 further includes a gear rack 708 having teeth at a first end 712 within the top housing 652 and a second end 716 extending from the top housing 652 supporting a facing roller 720. The second end 716 of the gear rack 708 is biased out of the top housing 652 by a biasing member 724 (e.g., a compression spring) positioned between the top housing 652 and the first end 712 of the gear rack 708. The gear rack 708 is configured so that, as the facing roller 720 moves linearly (e.g., is pushed into the top housing 652 or biased out of the top housing 652), the teeth of the gear rack 708 engage with a feed gear 728.

The feed gear 728 is mounted on a first one-way clutch 732 mounted on the long shifter hub 684. As the gear rack 708 moves in a first direction (e.g., into the housing), the feed gear 728 rotates the long shifter hub 684 about the axis of the drive shaft. As the gear rack 708 moves in a second direction (e.g., out of the housing), the feed gear 728 spins freely on the clutch 732. A second one-way clutch 736 is mounted to the long shifter hub 684 and fixed to the top housing 652 to prevent the long shifter hub 684 from back-turning when the gear rack 708 moves in the second direction.

A forward gear 740 is keyed to the long shifter hub 684 and rotates when the feed gear 728 rotates the long shifter hub 684. The forward gear 740 meshes with a first idler gear 744 connected by a shaft 748 to a second idler gear 752 to transfer rotation to the second idler gear 752. The second idler gear 752 meshes with a third idler gear 756 that, in turn, meshes with a reverse gear 760 fixed to the short shifter hub 688, thereby rotating the reverse gear 760 in a direction opposite the forward gear 740 and matching the gear ratios.

The forward shifter hub 700 and the reverse shifter hub 704 each have internal hex bores that mount on hex shaped cross-sections of the drive shaft 676. The forward shifter hub 700 is positioned adjacent the long shifter hub 684, and the reverse shifter hub 704 is positioned adjacent the short shifter hub 688. The shifter 696 has a pair of fork-shaped projections 764 that slide over and engage the forward shifter hub 700 and the reverse shifter hub 704, respectively, so that, as the shifter 696 is actuated, the forward shifter hub 700 and the reverse shifter hub 704 are simultaneously moved between a neutral position, a forward position, and a reverse position.

The shifter 696 is moved from the neutral position to the forward position by depressing the forward stop shaft 702 and, from the neutral position to the reverse position, by depressing the reverse stop shaft 698. In the neutral position, both the forward shifter hub 700 and the reverse shifter hub 704 are disengaged from the long shifter hub 684 and the short shifter hub 688 so that the drive shaft 676 does not rotate. In the forward position, the forward shifter hub 700 engages the long shifter hub 684 so that the drive shaft 676 is rotated by the forward gear 740. In the reverse position, the reverse shifter hub 704 engages the short shifter hub 688 so that the drive shaft is rotated by the reverse gear 760.

In the illustrated embodiment, the forward shifter hub 700 and the reverse shifter hub 704 have teeth that correspond to teeth on the long shifter hub 684 and the short shifter hub 688, respectively, so that the teeth interlock when in engagement. The first helical gear 680 is fixed to the drive shaft 676 so that the first helical gear 680 rotates with the drive shaft 676 in a first rotational direction when the shifter 696 is in the forward position and in a second, opposite rotational direction when the shifter 696 is in the reverse position.

The first helical gear 680 meshes with a second helical gear 768 fixed to the end of the radial feed screw 664 so that, as the first helical gear 680 rotates the second helical gear 768, the radial feed screw 664 is rotated, thereby moving tool holder 640 linearly along the facing arm 636 as the radial feed screw 664 rotates in the feed nut 668. In the forward position, the tool holder 640 is moved radially away from the axis A of the bar 14, and, in the reverse position, the tool holder 640 is moved radially inward toward the axis A of the bar 14. The tool holder 640 may be manually positioned on the facing arm 636 when the forward shifter hub 700 and the reverse shifter hub 704 are in the neutral position.

Figure 42:
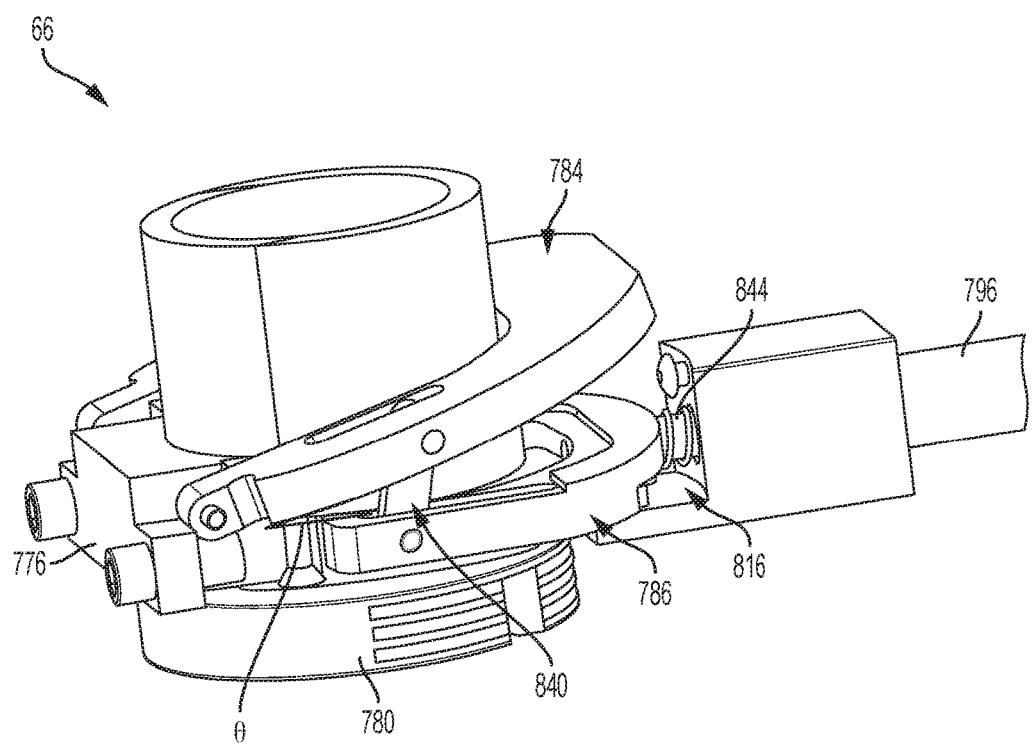
FIG. 42 is a perspective view of a portion of a facing tipper assembly illustrating a feed ramp.
Figure 43:
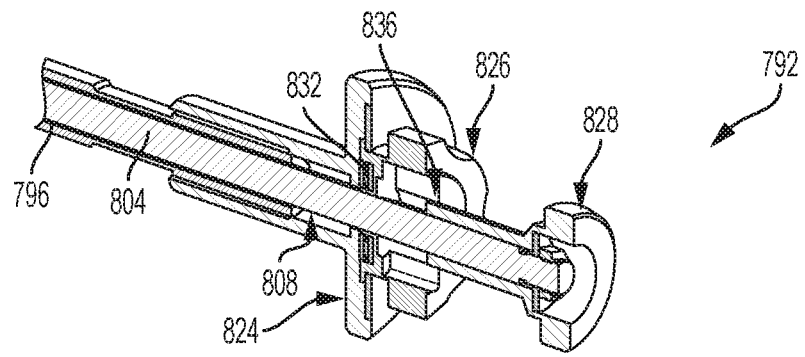
FIG. 43 is a cross-sectional view of an adjustment assembly of the facing tripper assembly of FIG. 42 illustrating a tripper release knob in an engaged position.
Figure 44:
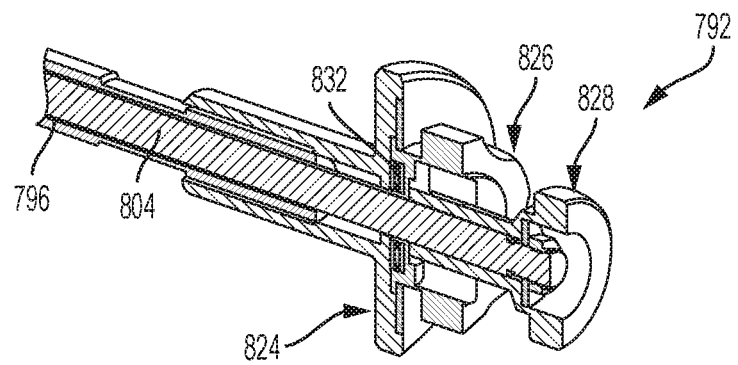
FIG. 44 is a cross-sectional view of the adjustment assembly of the facing tripper assembly of FIG. 42 illustrating the tripper release knob in a disengaged position.

As illustrated in FIGS. 42-44, the tripper assembly 66 includes a housing 776 having a shaft collar 780 configured to be clamped tightly to the bar 14 to inhibit the tripper assembly 66 from being moved axially on the bar 14 while allowing the tripper assembly 66 to spin freely on the bar 14. An adjustable feed ramp 784 is pivotably connected to the housing 776 and configured so that the facing roller 720 of the facing assembly 58 contacts the feed ramp 784 as the facing assembly 58 rotates with the bar 14. An adjustment assembly 792 includes a long handle 796 that allows the user to work from a distance away from the portable boring assembly 10.

The feed ramp 784 is angled so that the gear rack 708 is axially pushed into the top housing 652 by the feed ramp 784 and then biased out of the top housing 652 by the biasing member 724 as the facing roller 720 rides on the feed ramp 784. A radial feed rate of the facing assembly 58 is determined by how far the gear rack 708 is pushed in on each revolution of the bar 14. Adjusting an angle θ between the feed ramp 784 and an adjustment plate 786 adjusts the radial feed rate because the angle θ of the feed ramp 784 determines how far the gear rack 708 is displaced for each revolution of the bar 14 and the facing assembly 58. Accordingly, a steep ramp angle θ results in a faster feed rate while a shallow ramp angle θ results in a slower feed rate. The feed ramp 784 is designed so that the facing roller 720 is gradually and consistently fed over a large angle of rotation rather than having a short, rapid feed resulting from a star wheel type feed system (not shown). The gradual and consistent feed may result in a better surface finish on the work piece.

An adjustment shaft 804 has a first threaded end 808 connected to a tripper reset knob 828 and a second threaded end 816 threaded into a bore (not shown) of the adjustment plate 786. The adjustment assembly 792 further includes a feed adjustment knob 824 and a tripper release knob 826. The release knob 826 is positioned on a thrust bearing 832 located on the feed adjustment knob 824.

The release knob 826 has an engaged position and a disengaged position located, in the illustrated construction, 90 degrees apart. In the engaged position, a dowel 836 through both the reset knob 828 and the feed adjustment shaft 804 sits on top of the release knob 826. Turning the release knob 826 approximately 90 degrees allows the dowel 836 to drop into a slot in the release knob 826. The feed ramp 784 is activated by turning the release knob 826 from the disengaged position to the engaged position, which, when engaged, pulls the adjustment shaft 804 so that the adjustment plate 786 moves radially outwardly from the axis of the bar 14.

The feed ramp 784 is connected to the adjustment plate 786 by a pair of linkages 840. As the adjustment plate 786 moves radially outwardly, the pair of linkages 840 force the feed ramp 784 to pivot away from the adjustment plate 786 to increase the angle of the feed ramp 784. When the release knob 826 is engaged, turning the feed adjustment knob 824 pulls the adjustment shaft 804 to increase the feed ramp angle θ.

A compression spring 844 keeps tension on the release knob 826. To disengage the release knob 826, the reset knob 828 is pulled outward from the handle 796 to allow the release knob 826 to be rotated 90 degrees to the disengaged position. The compression spring 844 pushes the adjustment plate 786 back toward the axis A of the bar 14, thereby decreasing the angle θ of the feed ramp 784.

When disengaged, turning the feed adjustment knob 824 will not pull on the feed adjustment shaft 804, and the feed ramp 784 retracts to the flat position abutting the adjustment plate 786. Disengaging the release knob 826, allows the user to quickly reset the feed rate to an exact position from one facing pass to the next.

In operation of the facing assembly 58, the facing tool removes material from the face of the workpiece around the bore as the facing assembly 58 rotates with the bar 14. Radial feed of the facing assembly 58 is activated by turning the release knob 826 from the disengaged position to the engaged position. In the engaged position, the feed ramp 784 is angled away from the adjustment plate 786 resulting in the facing roller 720 being displaced into the top housing 652 by the feed ramp 784 with each rotation of the bar 14.

While the shifter 696 is in the neutral position, depressing the forward stop shaft 702 causes forward shifter hub 700 to engage the long shifter hub 684 resulting in the tool holder 640 being fed radially away from the axis A of the bar 14 along the axis C of the feed screw 664. Depressing the reverse stop shaft 698 causes the reverse shifter hub 704 to engage the short shifter hub 688 resulting in the tool holder 640 being fed radially away from the axis A of the bar 14. Rotating the feed adjustment knob 824 increases or decreases the angle θ of the feed ramp 784, thereby increasing or decreasing the radial feed rate of the facing assembly 58, respectively. Pulling the reset knob 828 and rotating the tripper release knob 812 to the disengaged position deactivates radial feed of the facing assembly 58.

One or more independent features or independent advantages of the invention may be set forth in the claims.

What is claimed is:

1. A boring head for a boring bar assembly, the assembly including a rotatably drivable boring bar extending along an axis, the head comprising:
   a body supportable on and for rotation with the bar;
   a first tool holder operable to support a first tool to work on a workpiece, the first tool holder being supported for radial movement on the body to adjust a radial position of the first tool relative to the axis; and
   a second tool holder operable to support a second tool to work on the workpiece, the second tool holder being supported for radial movement on the body to adjust a radial position of the second tool relative to the axis;
   wherein the first tool holder and the second tool holder are radially movable along a radial adjustment axis between a radially-inward position, in which the first tool holder and the second tool holder overlap, and a radially-outward position in which the first tool holder and the second tool holder do not overlap, wherein the axis and the radial adjustment axis lie in a plane, and wherein the first tool holder includes a first portion on one side of the plane and a second portion on an opposite side of the plane.

2. The head of claim 1, further comprising a radial adjustment screw connected between the body and the holder, the screw being rotatable to adjust the radial position of the holder relative to the body.

3. The head of claim 2, wherein the screw includes a first radial adjustment screw, and wherein the head further comprises a second radial adjustment screw connected between the body and the second tool holder, the second radial adjustment screw being rotatable to adjust a radial position of the second tool holder relative to the body.

4. The head of claim 1, wherein the first tool holder and the second tool holder are connected to the body to support the first tool and the second tool opposite sides of the axis.

5. The head of claim 4, wherein, in a radially-inward position, the first tool holder and the second tool holder nest around the axis.

6. The head of claim 5, wherein, in the radially-inward position, a projecting portion of the first tool holder nests in a recess of the second tool holder and a projecting portion of the second tool holder nests in a recess of the first tool holder.

7. The head of claim 1, wherein the first portion defines a first slot and the second portion defines a second slot.

8. The head of claim 7, further comprising:
   a first clamp bolt received in the first slot;
   a first clamp member engageable to clamp the first portion;
   a second clamp bolt received in the slot of the second slot; and
   a second clamp member engageable to clamp the second portion.

9. The head of claim 1, wherein the second tool holder includes a third portion on one side of the plane and a fourth portion on an opposite side of the plane.

10. The head of claim 9, wherein the third portion defines a third slot, and the fourth portion defines a fourth slot, and wherein the head further comprises:
    a third clamp bolt received in the third slot;
    a third clamp member engageable to clamp the third portion;
    a fourth clamp bolt received in the slot of the fourth slot; and a fourth clamp member engageable to clamp the fourth portion.

11. The head of claim 1, further comprising:
a carrier selectively connected to the first tool holder in a first radial position, in which the first tool is a first radial distance from the axis, and in a second radial position, in which the first tool is a second radial distance from the axis; and
a radial adjustment screw connected between the body and the carrier, the screw being rotatable to adjust the radial position of the first tool relative to the body.

12. A boring head for a boring bar assembly, the assembly including a rotatably drivable boring bar extending along an axis, the head comprising:
a body supportable on and for rotation with the bar;
a tool holder operable to support a tool to work on a workpiece, the holder being supported for radial movement on the body to adjust a radial position of the tool relative to the axis;
a carrier selectively connected to the holder in a first radial position, in which the tool is a first radial distance from the axis, and in a second radial position, in which the tool is a second radial distance from the axis; and
a radial adjustment screw connected between the body and the carrier, the screw being rotatable to adjust the radial position of the tool relative to the body.

13. The head of claim 12, wherein the screw defines an annular ridge captured by the carrier.

14. The head of claim 12, wherein the holder includes a first tool holder operable to support a first tool, and wherein the head further comprises a second tool holder operable to support a second tool to work on the workpiece, the second tool holder being supported for radial movement on the body to adjust a radial position of the second tool relative to the axis.

15. The head of claim 14, wherein the screw includes a first radial adjustment screw, and wherein the head further comprises a second radial adjustment screw connected between the body and the second tool holder, the second radial adjustment screw being rotatable to adjust a radial position of the second tool holder relative to the body.

16. The head of claim 14, wherein the first tool holder and the second tool holder are connected to the body to support the first tool and the second tool opposite sides of the axis.

17. The head of claim 16, wherein, in a radially-inward position, the first tool holder and the second tool holder nest around the axis.

18. The head of claim 17, wherein, in the radially-inward position, a projecting portion of the first tool holder nests in a recess of the second tool holder and a projecting portion of the second tool holder nests in a recess of the first tool holder.

19. A boring bar assembly comprising:
a rotatably drivable boring bar extending along an axis; and
a boring head including
a body supportable on and for rotation with the bar, the body defining an opening for receiving the bar,
a first tool holder operable to support a first tool on a first radial side of the bar to work on a workpiece, the first tool holder being supported for radial movement on the body to adjust a radial position of the first tool relative to the axis, and
a second tool holder operable to support a second tool on a second radial side of the bar to work on the workpiece, the second tool holder being supported for radial movement on the body to adjust a radial position of the second tool relative to the axis;
wherein the first tool holder and the second tool holder are radially movable along a radial adjustment axis between a radially-inward nested position, in which at least a portion the first tool holder nests in the second tool holder, and a radially-outward position in which the first tool holder and the second tool holder do not nest;
wherein the axis and the radial adjustment axis lie in a plane; and
wherein the first tool holder includes a first portion on one side of the plane and a second portion on an opposite side of the plane and the second tool holder includes a third portion on the one side of the plane and a fourth portion on the opposite side of the plane, the second portion nesting in a recess in the second tool holder between the third portion and the fourth portion, the third portion nesting in a recess in the first tool holder between the first portion and the second portion.

20. The assembly of claim 19, wherein the head further includes a radial adjustment screw connected between the body and the first tool holder, the screw being rotatable to adjust the radial position of the first tool holder relative to the body.

21. The assembly of claim 20, wherein the screw includes a first radial adjustment screw, and wherein the head further includes a second radial adjustment screw connected between the body and the second tool holder, the second radial adjustment screw being rotatable to adjust a radial position of the second tool holder relative to the body.

* * * * *